US012153392B2

(12) United States Patent
Vemuri et al.

(10) Patent No.: US 12,153,392 B2
(45) Date of Patent: Nov. 26, 2024

(54) SMART, PORTABLE DEVICE TO SAMPLE, MEASURE, ANALYSE, REPORT AND STABILISE PARAMETERS

(71) Applicants: Ramana Somasurya Vemuri, Hyderabad (IN); Sureshkumar Vemuri, Hyderabad (IN)

(72) Inventors: Ramana Somasurya Vemuri, Hyderabad (IN); Sureshkumar Vemuri, Hyderabad (IN)

( * ) Notice: Subject to any disclaimer, the term of this patent is extended or adjusted under 35 U.S.C. 154(b) by 366 days.

(21) Appl. No.: 17/638,492

(22) PCT Filed: Aug. 31, 2020

(86) PCT No.: PCT/IN2020/050756
§ 371 (c)(1),
(2) Date: Feb. 25, 2022

(87) PCT Pub. No.: WO2021/038598
PCT Pub. Date: Mar. 4, 2021

(65) Prior Publication Data
US 2022/0404239 A1 Dec. 22, 2022

(30) Foreign Application Priority Data
Aug. 29, 2019 (IN) .............................. 201941034848

(51) Int. Cl.
*G05B 19/042* (2006.01)
*G01N 1/10* (2006.01)
(Continued)

(52) U.S. Cl.
CPC ........... *G05B 19/0428* (2013.01); *G01N 1/10* (2013.01); *G16Y 40/35* (2020.01); *H04L 67/12* (2013.01)

(58) Field of Classification Search
CPC ........ G16Y 20/00; G16Y 40/00; G16Y 40/35; G05B 19/0428; H04L 67/12; G01N 1/10; G01N 2001/1427
See application file for complete search history.

(56) References Cited

U.S. PATENT DOCUMENTS 9,749,792 B2   8/2017   Klicpera
11,109,546 B2 *  9/2021   Weiler ................... A01G 25/16
(Continued)

FOREIGN PATENT DOCUMENTS

CN       102109511 B     6/2011
CN       104977263 A     10/2015
(Continued)

OTHER PUBLICATIONS

International Search Report for PCT/IN2020/050756 Dated Dec. 14, 2020.

*Primary Examiner* — An H Do
(74) *Attorney, Agent, or Firm* — McCormick, Paulding & Huber PLLC

(57) ABSTRACT

The invention discloses a SMART, portable internet of thing (IoT) based device and/or system to monitor various key parameters automatically, in a given operating area or operating system in various application fields, which automatically performs multiple monitoring functions such as sampling, measuring, analyzing, reporting and stabilizing key controllable parameters and there auto-maintain these parameters as per desired level. The SMART, portable device and system of the invention can be used in many applications in various fields such as Bio-Medical, Agriculture, Waste Treatment, Distilleries, RO Plants, etc, to name a few, where maintaining the key parameters like, pH, EC, Temperature, etc, are key for higher yields and/or efficient/ smooth functioning and there these key parameters are required to be controlled.

29 Claims, 19 Drawing Sheets

(51) Int. Cl.
    *G16Y 40/35*     (2020.01)
    *H04L 67/12*     (2022.01)

(56) References Cited

U.S. PATENT DOCUMENTS

| | | | |
|---|---|---|---|
| 11,407,653 B2 * | 8/2022 | Yates | G01M 3/2807 |
| 2016/0371830 A1 | 12/2016 | Barrasso et al. | |
| 2019/0121343 A1 | 4/2019 | Cella et al. | |

FOREIGN PATENT DOCUMENTS

| | | |
|---|---|---|
| IN | 312074 A | 4/2018 |
| WO | 2019003233 A1 | 1/2019 |
| WO | 2020084358 A1 | 4/2020 |

* cited by examiner

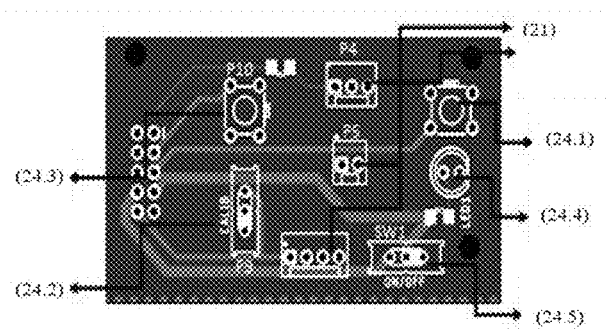
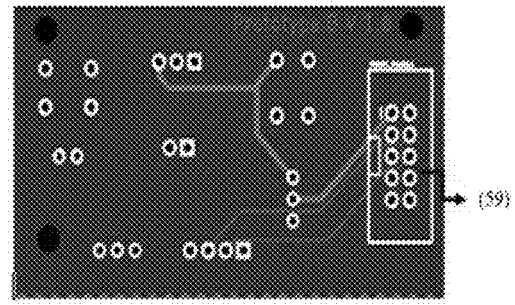
Figure-9a  Figure-9b
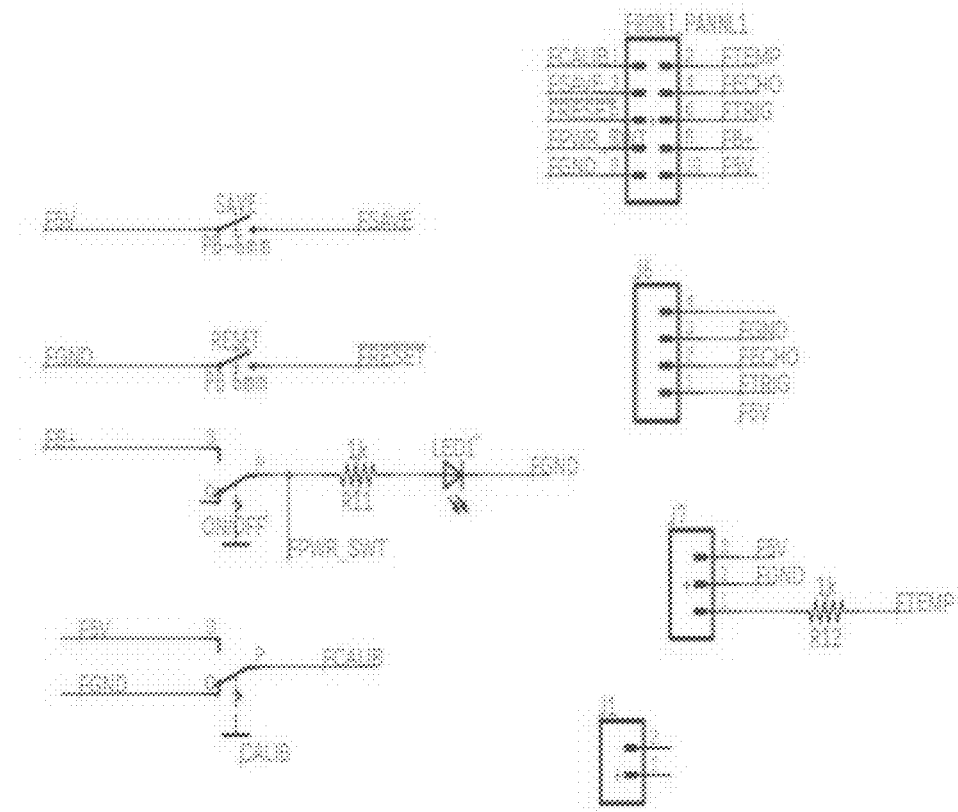
Figure-9c

Figure-13

SMART, PORTABLE DEVICE TO SAMPLE, MEASURE, ANALYSE, REPORT AND STABILISE PARAMETERS

RELATED PATENT APPLICATION(S)

This application is a National Stage application of International Patent Application No. PCT/IN2020/050756, filed on Aug. 31, 2020, which claims the priority to and benefit of Indian Provisional Patent Application No. 201941034848 filed on Aug. 29, 2019; the disclosures of each of which are incorporated herein by reference.

TECHNICAL FIELD

The invention relates to a SMART internet of thing (IoT) based device and/or system to monitor various key parameters automatically, in a given operating area or operating system in various application fields. More particularly the invention relates to a SMART IoT device and system which automatically performs multiple monitoring functions such as sampling, measuring, analyzing, reporting and stabilizing key controllable parameters in a given operating area or a system, which area or system requires monitoring of various key parameters, essential for the efficient functioning of the function/activity assigned in that area or in that system. The SMART, portable IoT device and system of the invention can be used in many applications in various fields such as Pharma/Bio-Medical, Agriculture, Sewage and Waste Treatment Plant, Distilleries, Reverse Osmosis (RO) Plants, etc, to name a few, where maintaining the key parameters like, pH, EC, Temperature, Liquid Levels, Light Luminosity, Liquid Flow Rate, Dissolved Oxygen, Carbon Dioxide, etc, are key for higher yields and/or efficient/smooth functioning and there these key parameters are required to be controlled.

BACKGROUND

In various industrial applications, environment based applications and other similar applications, in a given operating area or operating system, various key parameters are required to be monitored continuously and sometime simultaneously to keep/maintain the values of these key parameters at desired level for the efficient/smooth functioning.

Thus continuous monitoring of parameters is required, with the help of the measuring devices/instruments. In many cases in Industrial, Bio-Medical, Agricultural, and similar fields, the operating area/system comprises multiple numbers of key parameters and these parameters are monitored by multiple numbers of measuring devices/instruments. Multiple numbers of parameters need to be monitored with the help of measuring devices/instruments. Carrying out such multiple motoring is not always easy and many times such parameters which are critical for the efficient functioning of the application left unmonitored and/or can't be monitored at a desired time point at which a particular parameter was needed to be monitored and maintained in a desired value/level.

This causes adverse effect in the activity in the area/system.

Therefore there is a need of a portable device and/or system which can automatically perform the monitoring of these multiple key parameters at desired point of time to be maintained at a desired level/value and to achieve this there is a need of device/system which can automatically perform multiple monitoring functions such as sampling, measuring, analyzing, reporting and stabilizing key controllable parameters in a given operating area or a system, which area or system requires monitoring of multiple key parameters, essential for the efficient functioning of the function/activity assigned in that area or in that system.

The present invention provides a portable, one stop SMART IoT (Internet of Thing) device/system and a method therefor, which can be used for multiple applications in various fields, which can automatically perform multiple monitoring functions such as sampling, measuring, analyzing, reporting and stabilizing key controllable parameters and ensures all steps of Sampling, Measuring, Analyzing, Reporting and sTabilizing (SMART) is done at one place, wherein continuous monitoring is done and key parameters are stabilized at desired value/level automatically. Thus efficient and/or smooth functioning is achieved and ensured.

The internet of things, in short "IoT" is a system where multiple computing objects, mechanical and digital machines/devices/instruments and/or people, each having unique identity are connected over a network and able to communicate and exchange data/information, which may not require human interaction.

The known systems or devices based on IoT are limited to one application, or do few steps of sampling, measuring, analyzing, and reporting or limited to capture information at Cloud. Some of such prior arts are briefly discussed below Indian Patent Application no. 201831040353 describes an IoT based portable test device which analyzes the liquid sample of human body, which device is only limited to the testing of Blood and Urine Samples.

Another Indian Patent Application no. 201821014475 discloses an IoT (Internet of Things) based time switch to control at least one electric load, wherein the time switch is configured and operated by a remote user via a central processing engine, and communicates with the central processing engine using any or a combination of 2G, 3G, Wi-Fi, LoRa and NB-IoT. The time switch has a geo-tag for location determination and a QR code for its quick configuration and identification on web/mobile interface. The time switch measures electrical parameters comprising any or a combination voltage, current, active power, power factor, energy, frequency, over/under voltage, over current, low power factor and over/under load, generates fault notifications, and escalates them in case of non-rectification within a predetermined time. This invention is limited to controlling of various electrical equipments.

Publication no. US20160371830A1 refers to an autonomous plant growing system. The invention provides a system including: a camera, one or more light sources, and a controller. The controller is programmed to: receive an image of one or more plants from the camera; apply a segmentation algorithm to produce a binary image from the image; apply a thresholding algorithm to classify the one or more plants within the binary image as being in one or several stages of plant life; and control operation of the one or more light sources based on a classified stage of plant life.

Another publication no. US20190121343A1 discloses a system and methods for data collection, processing, and utilization of signals in an industrial environment. A data acquisition circuit is structured to interpret a plurality of detection values from a plurality of input sensors which are communicatively coupled to the data acquisition circuit, a peak detection circuit is used to determine at least one peak value in response to the plurality of detection values, and a peak response circuit is used to select at least one detection value in response to the at least one peak value. Also a communication circuit is used to communicate the at least one selected detection value to a remote server, and a monitoring application on the remote server to receive the at least one selected detection value, jointly analyze received detection values and recommend an action in response.

Chinese Patent CN102109511B describes a wireless sensor network-based sewage monitoring network structure based on a wireless sensor network which comprises a monitoring center, a plurality of sewage parameter monitoring systems and a sewage treatment process monitoring system. The sewage parameter monitoring systems are connected with the monitoring center by the wireless sensor network and is based on a ZigBee network and each sewage parameter monitoring system and the sewage treatment process monitoring system respectively comprise a communication module, a base station and sensor nodes.

Indian Application no. 201741022346 discloses a system with Cloud Based Application, that involves monitoring of energy consumption or generation at source and in turn enables the user to control it as per the constraints configured in a given process.

The major drawback of all the above cited prior arts are the device or system performs or do few steps of sampling, measuring, analyzing or testing, reporting and monitoring/controlling. Also the system or device are restricted to one application.

The need for one of the companies in the Agriculture Industry was to maintain the key nutrient parameters, to ensure higher yield, and portable. The current system is a lab system, where the samples are taken out at pre-defined frequency, taken to lab, measured, recorded, compared with standards, and deviations noted. These are mostly recorded manually, or in a hard disk of a system.

The corrective steps (in case of deviations) may be taken at a pre-defined fixed interval or sometimes based on the readings.

Some of the current System/Product Bottlenecks:
1. Lab setup—Expensive and Laborious
2. Readings noted maybe stored in external devices or can be lost
3. Corrective step is sometimes dependent on capability of the Process or Individual
4. Frequency of corrective steps may vary leading to erroneous conclusions (The system might have changed condition in the interim period)

There was a need for a Product & system, which can:
1. Do Continuous monitoring of the key parameters
2. Portable and can be installed easily
3. Do instant correction of the system to maintain the key parameters
4. Is expandable and multipurpose.
5. Ensure storage of data for long time, data cannot be destroyed, data can be easily analyzed, multi data representation possibility, etc.

Can be universal and applicable to different industries

SMART (Sample, Measure, Analyze, Report, Stabilize) Internet of Things (IoT) device ensures all the above needs for the product and system are met.

The present invention overcomes the above prior art limitations and provides a portable, SMART IoT Device and/or System to perform the multiple operations in the single device and can be used in the multiple fields as well. This SMART IoT Device is an easy to carry portable device and can be used to perform the operations like sampling, measuring, analyzing, reporting and stabilizing in one device.

OBJECTS OF THE INVENTION

The primary object of the invention is to provide a portable, SMART IoT based device and system to monitor key parameters which device/system can be used in multiple applications in various fields.

One objective is to design and provide a portable device and/or system for support for a closed loop application to maintain the multiple key parameters during an operation in various fields.

Another objective is to design and provide a portable IoT based, SMART device and/or system for auto maintain of key parameters in an Industrial applications, Environment based applications, or any other application in any field, where monitoring and controlling of key parameters are required continuously.

Another objective is to design and provide a portable IoT based, SMART device and/or system, which device/system can be used in multiple applications in various fields such as non-limiting examples: Industrial applications (Bi-Medical, Distilleries, Water Treatment, etc.) and Environment based application (Agriculture, Waste Management, etc.) where there is need for the key parameters to be maintained in a stable manner for higher and sustainable yields. This SMART IoT device is devised to solve a very crucial problem being faced by the various agencies, to be able to ensure proper yield in many applications. This device can help solve the problems for the common man, governing agencies, as well as the various industries in knowing the key parameters functioning at all times on the mobile app, and the device's smart stabilizing technique helps auto maintain these key parameters.

Another objective of the invention is to continuously monitor and automatically stabilize the key parameters, with cloud storage of information, and with a long term view of having a database for Artificial Intelligence.

SUMMARY

Accordingly, the invention discloses and provides a SMART internet of thing (IoT) based device and/or system to monitor various key parameters automatically, in a given operating area or operating system in various application fields. More particularly the invention relates to a SMART IoT device and system which automatically performs multiple monitoring functions such as sampling, measuring, analyzing, reporting and stabilizing key controllable parameters in a given operating area or a system, which area or system requires monitoring of various key parameters, essential for the efficient functioning of the function/activity assigned in that area or in that system. The SMART, portable IoT device and system of the invention can be used in many applications in various fields such as Pharma/Bio-Medical, Agriculture, Sewage and Waste Treatment Plant, Distilleries, Reverse Osmosis (RO) Plants, etc, to name a few, where maintaining the key parameters like, pH, EC, Temperature, Liquid Levels, Light Luminosity, Liquid Flow Rate, Dissolved Oxygen, Carbon Dioxide, etc, are key for higher yields and/or efficient/smooth functioning and there these key parameters are required to be controlled.

In one embodiment the invention provides a SMART Internet of Things (IoT) device (100) for automatically performing the continuous monitoring and stabilizing functions to control key controllable parameters (P) of application system (51) at application field (52) at desired parameter level, the device comprises components:

a Sensor and Sampling Box (1) to perform the monitoring functions of sampling, measuring, analyzing, reporting;

an Actuator Box (2) to perform stabilizing function;

a Control Panel (24) for user input and indication;

a Network System (25) for communication;

one or more Controllers (26) to control the all the functions of the device;

one or more Circuit Boards (27) to connect all the device components electrically;

wherein, the said sensor and sampling box (1) collect samples (50) from the sample source (53), measure the parameters (P), analyze the measured parameter value (31), store and report the measured data as signal to cloud server (30) via network system (25) and drain back the samples (50) into the source (53) and continue this monitoring function in cycle; wherein, the one or more controllers (26) with the help a set of instructions (38), compares the measured parameter value (31) with standard parameter value (32); wherein, when a deviation (33) in the measured values (31) is observed by the controller (26), it sends the deviation data and signal to cloud server (30), notifies the user (19) at user interface (35); and wherein, based on set of instructions (38), the controller (26) triggers and activates the actuators (11) of the actuator box (2) to perform stabilizing function to correct and stabilize the respective parameters (P) where the sample parameter deviation (33) observed.

The Sensor and Sampling Box (1) and the Actuator Box (2) are connected by detachable couplers (40), wherein when needed, the Actuator Box (2) is physically detached from the SMART IoT device (100), while electronically connected with the SMART IoT device (100) by the help of Network System (25) and able to perform the same functions as perform in physically attached Actuator Box (2).

In one embodiment, the Sensor and Sampling Box (1) comprises:

a chamber (5) accommodating one or more sample containers (6) which hold samples (50), one or more sensors holding slots (7) to hold one or more measuring sensors (8), one or more sample collecting motors (10) and one or more inlet/outlet ports (17).

In one embodiment of the invention opening of sensors holding slots (7) correspond to opening of container (6) which enables insertion and placing of sensors (8) inside the samples (50) of respective containers (6) for measuring controllable parameters of the respective samples; and sampling pipe connections (9) connect sampling motors (10), sample inlet/outlet (17) of sample containers (6) and sample sources (53) for inlet and outlet of samples (50) of one or more application system (51) at application field (52) where one or more parameters are desired to be monitored, analyzed, and stabilized.

In one embodiment of the invention the Actuator Box (2) comprises:

one or more actuators (11);

one or more dousing containers (12) for holding dousing liquids (15);

one or more douser Motors (13);

actuators outlet pipes (14), each pipe at one end connected with dousing container (12) to draw dousing liquid (15) and at other end connected with the sample source (53) of one or more application system (51) at application field (52) where one or more parameters are desired to be stabilized.

In one embodiment of the invention, the controller (26) performs the said stabilizing function by the help of dousing liquids (15) stored in dousing containers (12) of the actuator box (2), wherein the actuators (11) drives the dousing motors (13) to draw dousing liquids (15) in required doses and sends into the sample source (53) where the deviation (33) observed, wherein the source liquid (53) with imbalanced parameter level receives the dousing liquid (15) and stabilize the parameter.

In one embodiment of the invention, the control panel module (24) comprises reset button (24.1), calibration button (24.2), save button (24.3), LED indicator (24.4) and ON/OFF switch (24.5).

In one embodiment of the invention, the one or more controllers (26) is configured with a set of instructions (38) stored in a memory or provided to controller to control and to operate the device to perform all the functions of the IoT device autonomously for continuous monitoring and stabilization of desired parameters.

In one embodiment of the invention, said set of instructions (38) comprises user input instructions (36) and predefined instructions (22) fed and stored in the device controller (26).

In one embodiment of the invention, said one or more circuit boards (27) electrically connect measuring sensors (8), sampling motors (10), actuators (11), douser Motors (13), control panel module (24), network system (25), controller devices (26), USB port (28), power supply module (29), Battery System (43), Voltage Regulators (45) and Motor Driver (60).

In one embodiment of the invention, the network system (25) for communication comprises one or more Wi-Fi system (44), cloud server (30) and network protocols (20) combinedly enables send and receive of communication data or signals between the IoT device (100), server (30), user (19) and one or more external devices and peripheral devices, connected directly or indirectly with the IoT device (100) or its network system (25).

Where the Wi-Fi system (44.1) or (44.2) of system (44) cannot be connected to cloud server (30), it can be replaced by localized solution by providing local Wi-Fi/Zigbee as communication module (44.3) to ensure data goes to local server.

Dousing Liquids (15) are the supplemental liquids for example water, buffer solutions, nutrient solutions and other solutions required to be added/supplemented to the sample source to stabilize and maintain parameters at desired level at source. In one embodiment, Dousing Liquids (15) comprises buffer solutions (acid solution and/or alkaline solution) to maintain pH parameter, nutrient solutions to maintain EC parameter, water and other solutions depending on the parameters to be stabilize and maintained at source.

The controller in the circuit board comprises one or more memory for storage of instructions, data, algorithms, and logics. The memory can be Electrically Erasable Programmable Read-Only Memory (EEPROM) or any other type of memory. In one embodiment, the memory of controller comprises EEPROM.

In one embodiment of the invention, the device optionally comprises Peripheral Sensor Boxes (3), which can be attached with the device (100) for monitoring of parameters.

In one embodiment of the invention, the peripheral sensor box (3) comprises Atmosphere Parameter Sensor Box (54) for monitoring of parameters Temperature, Luminosity, Oxygen level, and Co2.

In one embodiment of the invention, the device optionally comprises remotely located additional Independent Sensor Box (4) and connected to the system of the device to perform the measuring function.

In one embodiment of the invention, the said remotely located individual measuring device sensor box (4) comprises Height Measuring Device (56), Flow Rate Measuring Device (57), Soil Parameter Measuring Device (58).

In one embodiment of the invention, the device retrieves data and inputs stored in the cloud (30) by peripheral sensor box (3), additional standalone sensor box (4) and one or more other stand-alone external devices, wherein the said data and input of external devices are stored in the cloud (30) in the format of the SMART IoT device data.

In one embodiment of the invention, the said triggering by controller (26) is based on user input instructions (36) provided by user (19) or predefined set of instructions (22) stored in the memory (39) of the controller (26).

In one embodiment of the invention, the device comprises only one main circuit board PCB (27) with one controller (26).

In one embodiment of the invention, the device comprises one controller (26a) in the main circuit board (27a) of the sampling and sensor box (1) and one controller (26b) in the main circuit board (27b) of the actuator box (2).

In one embodiment of the invention, the Sensor and Sampling Box (1) comprises:
 a chamber (5) accommodating sample containers (6a, 6b, ... 6n) which hold samples (50),
 sensors holding slots (7a, 7b, ... 7n) to hold respective number of measuring sensors (8).

In one embodiment of the invention, the Sensor and Sampling Box (1) comprises:
 a chamber (5) accommodating two sample containers (6a, 6b) which hold samples (50a, 50b),
 two sensors holding slots (7a, 7b) to hold measuring sensors (8),
 Sample Collecting Motors (10a, 10b) and inlet/outlet ports (17a, 17b).

In one embodiment of the invention, the Actuator Box (2) comprises:
 actuators (11a, 11b, ... 11n);
 douser Motors (13);
 actuators outlet pipes (14).

In one embodiment of the invention, the sampling motors (10) and the dousing motors (13) are peristaltic pump.

The said key controllable parameters (P) are selected from pH, EC, Temperature, Liquid Levels, Light Luminosity, Liquid Flow Rate, Dissolved Oxygen and Carbon Dioxide In one embodiment of the invention, the operating step of each cycle of the liquid parameter sensor and sampling box (1) comprises:
 a. starting of the sample collecting motor and drawing the sample into the holder;
 b. starting the analyzation of the sample;
 c. starting of sample module circuitry of the main module and the sensors for EC, PH, liquid temperature, etc. record the readings in each cycle of liquid stabilizing system;
 d. storing of the reading as measured values (31) in open source cloud server (30);
 e. displaying the stored reading;
 f. comparing the measured values (31) results with the standard values (32) using logic and calculating the deviation of parameter;
 g. concluding the recording of parameter and starting the system motor to drain the liquid back into the source.

In one embodiment of the invention, the operating step of each cycle of the detachable actuator box (2) comprises:
 a. retrieving the stored data by the parameter sensor and sampling box from the cloud (30) using a Wi-Fi system (44) of the network system (25);
 b. activating the corresponding douser based upon deviation (33) calculated by the parameter sensor and sampling network;
 c. calculating the dosage quantity of douser;
 d. sending the calculated dosage to the source;
 e. checking for any other deviation (33) recorded by the parameter sensor and sampling box, optionally if any deviation (33) is recorded, repeating step (b)-step (d).

The timings of the sampling motors (10) are timed which allows the sample liquid (50) to be held in the containers (6) for a time set time minutes which allow to stabilize the sample. In one embodiment of the invention, the time is 1-5 minutes, preferably 1-2 minutes. The said cycle is repeated at a preset time interval, which ensures continuous monitoring and measurement of parameters.

In another embodiment, the invention discloses and provides a SMART IoT system (100') for automatically performing the continuous monitoring and stabilizing functions to control key controllable parameters (P) of application system (51) at application field (52) at desired parameter level, comprising the SMART IoT device (100) herein above described.

The SMART IoT system (100') comprises:
 a Sensor and Sampling Box (1) to perform the monitoring functions of sampling, measuring, analyzing, reporting;
 an Actuator Box (2) to perform stabilizing function;
 a Control Panel (24) for user input and indication;
 a Network System (25) for communication;
 one or more Controllers (26) to control the all the functions of the device;
 one or more Circuit Boards (27) to connect all the device components electrically;
wherein,
 the said sensor and sampling box (1) collect samples (50) from the sample source (53), measure the parameters (P), analyze the measured parameter value (31), store and report the measured data as signal to cloud server (30) via network system (25) and drain back the samples (50) into the source (53) and continue this monitoring function in cycle;
wherein,
 the one or more controllers (26) with the help a set of instructions (38), compares
 the measured parameter value (31) with standard parameter value (32);
wherein,
 when a deviation (33) in the measured values (31) is observed by the controller (26), it sends the deviation data and signal to cloud server (30), notifies the user (19) at user interface (35); and
wherein,
 based on set of instructions (38), the controller (26) triggers and activates the actuators (11) of the actuator box (2) to perform stabilizing function to correct and stabilize the respective parameters (P) where the sample parameter deviation (33) observed.

The SMART IoT system (100') monitors controllable parameters (P) selected from pH, EC, Temperature, Liquid Levels, Light Luminosity, Liquid Flow Rate, Dissolved Oxygen and Carbon Dioxide.

The operating step of each cycle of the liquid parameter sensor and sampling box (1) of the system (100') comprises:

a. starting of the sample collecting motor and drawing the sample into the holder;
b. starting the analyzation of the sample;
c. starting of sample module circuitry of the main module and the sensors for EC, PH, liquid temperature, etc. record the readings in each cycle of liquid stabilizing system;
d. storing of the reading as measured values (31) in open source cloud server (30);
e. displaying the stored reading;
f. comparing the measured values (31) results with the standard values (32) using logic and calculating the deviation of parameter;
g. concluding the recording of parameter and starting the system motor to drain the liquid back into the source.

The operating step of each cycle of the detachable actuator box (2) of the system (100') comprises:
a. retrieving the stored data by the parameter sensor and sampling box from the cloud (30) using a Wi-Fi system (44) of the network system (25);
b. activating the corresponding douser based upon deviation (33) calculated by the parameter sensor and sampling network;
c. calculating the dosage quantity of douser;
d. sending the calculated dosage to the source;
e. checking for any other deviation (33) recorded by the parameter sensor and sampling box, optionally if any deviation (33) is recorded, repeating step (b)-step (d);

The timings of the sampling motors (10) of the system are timed which allows the sample liquid (50) to be held in the containers (6) for a time set time minutes which allow to stabilize the sample. The said cycle of the system is repeated at a preset time interval, which ensures continuous monitoring and measurement of parameters.

A SMART IoT system (100') involving the SMART IoT device (100) as described above and as shown in FIGS. 1-16.

BRIEF DESCRIPTION OF THE DRAWINGS

FIG. 7b: Shows the Front Side View of device of FIG. 7a.
FIG. 7c: Shows the Left Side View of device of FIG. 7a.
FIG. 7d: Shows the Top Side View of device of FIG. 7a.
FIG. 8a: Shows the Top Side View of PCB of Sensor and Sampling Box (1) of Device of FIG. 7a.
FIG. 8b: Shows the Bottom Side View of PCB of Sensor and Sampling Box (1) of Device of FIG. 7a.
FIG. 9a: Shows the Top Side View of Control Panel PCB (User Input) of Device of FIG. 7a.
FIG. 9b: Shows the Bottom Side View of Control Panel PCB (User Input) of Device of FIG. 7a.
FIG. 9c: Shows the Schematic of PCB of FIGS. 9a-9b.
FIG. 10a: Shows the Top of Side View of PCB of Detachable Actuator Box (2) of Device of FIG. 7a.
FIG. 10b: Shows the Schematic of PCB of FIG. 10a.
FIG. 11b: Shows the PCB of Atmosphere Parameter Sensor Box of FIG. 11a.
FIG. 12b: Shows the PCB for Standalone Height Measuring Sensor Box (4) of FIG. 12a.
FIG. 13: Shows an example of Data Out-put format (Excel).

DETAILED DESCRIPTION

Figure 1:
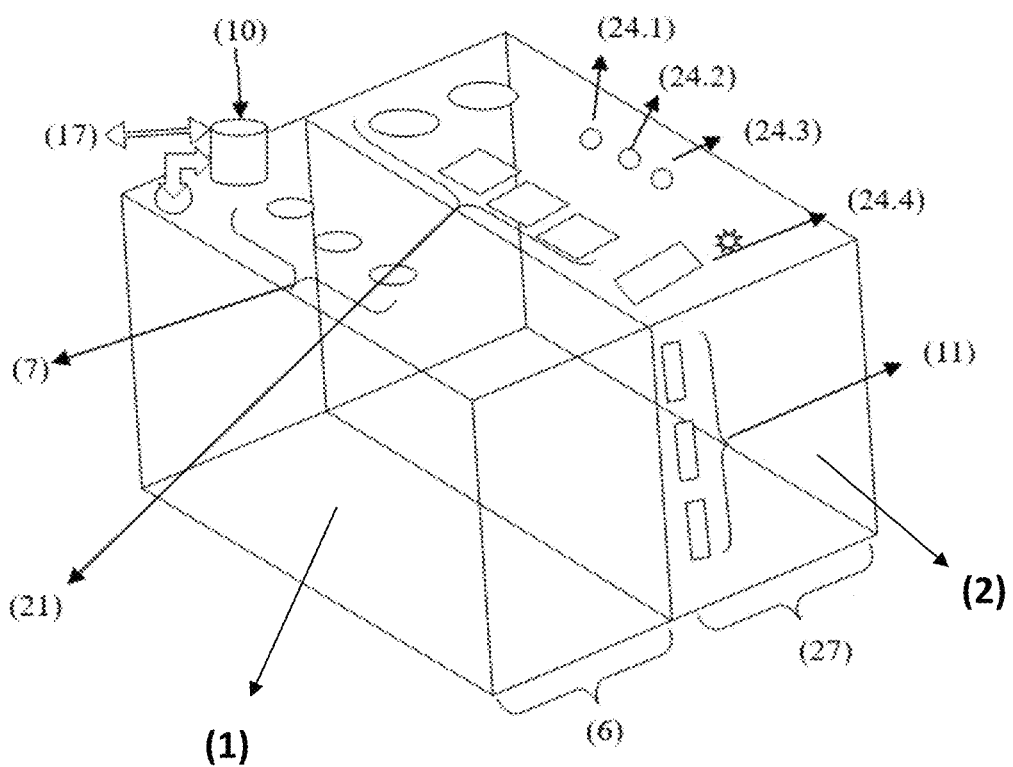
FIG. 1: Shows the outline of the SMART IoT device and system of the present invention.

Accordingly, the invention discloses and provides portable, one stop SMART IoT (Internet of Thing) device/system and a method therefor, which can be used for multiple applications in various fields, which can automatically perform one or more monitoring functions such as sampling, measuring, analyzing, reporting and stabilizing key controllable parameters and ensures all steps of Sampling, Measuring, Analyzing, Reporting and sTabilizing (SMART) is done at one place, wherein continuous monitoring is done and key parameters are stabilized at desired value/level automatically. Thus efficient and/or smooth functioning is achieved and ensured.

Further the SMART IoT device and System of the present invention also enables monitoring and stabilizing at remote location wherein additional sensors boxes cab be used at the remote application filed and connect with the SMART IoT device/system via wireless network system communication.

The SMART IoT Device is an easy to carry portable device, which has two main compartments
 one compartment (First) for monitoring functions which collects, stores and stabilizes the samples, and measure the parameters;
 another compartment (Second) to initiate corrective measures to stabilize the parameters, when the device observes any deviation in the parameters while performing the monitoring functions in first compartment.

The first compartment can either automatically draw samples from the application system or the samples can be manually inputted in the samples holding containers of this compartment. In one embodiment, pumps are used. This Compartment stabilizes the samples and then measuring devices/sensors are used to measure the parameters of these samples. The measuring devices from the first compartment are connected with the other second compartment wherein the SMART device does the measurement in a systematic programmed manner with a logic, and does comparisons with standards through that logic. The app of the system displays these readings of above measurements along with indicating the alarms, sends the data via Wi-Fi communication module to cloud server where these data are stored, displayed, and reported to user.

Based on the alarms or user input instruction or predefined set of instructions fed in the controller of the IoT device, the logic triggers a system wherein the second compartment initiate corrective measures to stabilize the parameters, wherein the actuators present draws the dossier supplemental liquids stored in the containers external to the second compartment and add to the application system sample source where deviation in parameters level is detected, and does the auto stabilizing of the key parameters of application system, as per the application need.

The samples are again measured, and the loop continues, as per the logic.

This ensures continues Measurement, Analysis, Monitoring and Stabilizing of the system. The device and/system of the present invention can be applied across various applications and various Industries.

Brief Description and Function of the SMART IoT Device

The above said first compartment is a sensors and sampling box compartment (1) which comprises:
- a chamber (5) provided with containers (6) for holding samples (50) and the device box above the containers provided with sensors holding slots (7) to hold measuring sensors (8) to be placed inside the respective containers for measuring controllable parameters.
- sampling pipe connections (9) connecting with sampling motors (10) respectively connecting the respective containers with sample sources (53) for inlet and outlet of samples of one or more application system (51) at field of application (52) where one or more parameters are desired to be monitored, analyzed, and stabilized.

The above said second compartment is an actuator box compartment (2) which comprises actuators (11), dousing containers (12) for holding dousing liquids (15) which are external to the actuator box compartment (2), douser Motors (13), actuators outlet pipes (14) connected to draw douser liquids (15) from the dousing containers (12) respectively and add into the respective sample sources (53) of one or more application system (51) at site of application (52) where one or more parameters are desired to be stabilized.

The device and system of present invention comprises a control panel module (24) for user input and indication; a wireless communication module such as Wi-Fi system (44) for sending data and signals from the device to cloud server (30) and user and the device to receive data and signals from server (30) and user (19).

The Device comprises one or more controllers (26), provided with a set of instructions (38) wherein the set of instruction (38) can be a set of predefined instruction (22) such as a logic (41) and Algorithm (42) stored in a memory of the controller (26) to control and to operate the device to perform all the functions of the IoT device autonomously for continuous monitoring and stabilization of desired parameters.

The device comprises one or more circuit boards (27) connecting various components of the device such as sensors/measuring devices (8), sampling motors (10), actuators (11), douser motors (13), control panel module (24), wireless communication module such as Wi-Fi system (44), network system (25), USB port (28), power supply module (29), display module (61) and controller device (26).

In one embodiment, the SMART IoT device comprises only one main controller (26) for both the compartments (1,2).

In one embodiment, the SMART IoT device comprises two main controllers (26a, 26b), one for the compartment (1) and another for the compartment (2).

In one embodiment, the SMART IoT device comprises only one main circuit board (27) (one PCB) for both the compartments (1,2).

In one embodiment, the SMART IoT device comprises two main circuit boards (27a, 27b) (two PCBs) one for the compartment (1) and another for the compartment (2).

In one embodiment, the SMART IoT device comprises one controller (27a) in the main circuit board (PCB) of the sampling and sensor box (1) and another controller (27b) in the main circuit board (PCB) of the actuator box (2).

In one embodiment, in the SMART IoT device the actuator box compartment (2) is detachable from the sampling and sensor box compartment (1), wherein the actuator box (2) is detachably coupled with the sampling and sensor box compartment (1) with the help of detachable couplers (40). This helps the convenient application of the SMART IoT device as per requirement at the application site and/or nature.

The above said SMART IoT device continuously performs the monitoring function and take the measurements and send the analog data to controller (26) of the device where it is stored and converted to digital data/signal and compared with the standard values (32) and then via Wi-Fi system (44) of the network system (25) send to cloud server (30) where these data are stored and presented/displayed to user (19).

The measured values are compared with the predefined standard values (32) provided in the controller (26) and when a deviation (33) in the measured values is observed by the controller, it send the deviation (33) data to cloud (30), notifies the user (texts message or display) at user interface (35) such as mobile/computer.

Based on the deviations (33) from the standard (32) in these parameters, the ACTUATOR BOX (2) is triggered and activates the actuators (11) to help activate the right dousing of the needed liquid. This ACTUATOR BOX (2) can also be termed as the slave device, which gets its inputs from the Master device(s) (Parameter Sensor and Sampling box (s) (1))

If the SENSOR and SAMPLING BOX (1) is the Master & Heart of the device and/or System, the ACTUATOR BOX (2) is the Slave & Mind of the device and/or System.

Based on the set of instruction (38) which comprises user input instruction (36) or predefined set of instructions (22) (logic (41) and Algorithm (42)) fed in one or more controllers (26) of the IoT device, controller triggers and activates the respective actuators (11) to draw respective dousing liquids (15) from dousing containers (12) by the help of dousing motors (13) and add the douser supplemental liquids (15) into the respective sample sources (53) to correct and stabilize the respective parameters where the sample parameter deviation observed.

In one embodiment, the invention discloses a SMART IoT device (100) for automatically performing the continuous monitoring and stabilizing functions to control key controllable parameters (P) of application system (51) at application field (52) at desired parameter level, the device comprises components:
- a Sensor and Sampling Box (1) to perform the monitoring functions of sampling, measuring, analyzing, reporting;
- an Actuator Box (2) to perform stabilizing function;

a Control Panel (24) for user input and indication;

a Network System (25) for communication;

one or more Controllers (26) to control the all the functions of the device;

one or more Circuit Boards (27) to connect all the device components electrically;

wherein, the said sensor and sampling box (1) collect samples (50) from the sample source (53), measure the parameters (P), analyze the measured parameter value (31), store and report the measured data as signal to cloud server (30) via network system (25) and drain back the samples (50) into the source (53) and continue this monitoring function in cycle;

wherein, the one or more controllers (26) with the help a set of instructions (38), compares the measured parameter value (31) with standard parameter value (32);

wherein, when a deviation (33) in the measured values (31) is observed by the controller (26), it sends the deviation (33) data and signal to cloud server (30), notifies the user (19) at user interface (35); and wherein, based on set of instructions (38), the controller (26) triggers and activates the actuators (11) of the actuator box (2) to perform stabilizing function to correct and stabilize the respective parameters where the sample parameter deviation observed.

In one embodiment, the SMART IoT device optionally comprises peripheral sensor boxes (3) which can be attached with the IoT device for monitoring and stabilizing of parameters. One example of such peripheral sensor box (3) is Atmosphere Parameter Sensor Box (54) for monitoring and stabilizing of parameters Temperature, Luminosity, Oxygen level and Co2.

The SMART IoT device (100) can retrieve data and inputs stored in the cloud (30) by peripheral sensor box (3), additional standalone sensor box (4) and one or more other stand-alone external devices, wherein the said data and input of external devices are stored in the cloud (30) in the format of the SMART IoT device data.

In one embodiment, the SMART IoT device optionally comprises additional remotely located individual measuring devices/sensors and connected to the system of the IoT device via network connection such as Wi-Fi module via cloud communication Examples of such remotely located individual measuring devices includes Height Measuring device (56), Flow rate Measuring device (57) and Soil Parameter Measuring Device (58).

The above device and/or system is further described below with reference to figures of the presentation.

FIGS. 1-6:

In one embodiment the invention provides a SMART IoT device which comprises a single main circuit board (one PCB (27)) for both the sampling and sensor box (1) and the actuator box (2). In this embodiment, the sampling and sensor box (1) and the actuator box (2) of the device can be detachable or non-detachable.

In another embodiment of the invention the sampling and sensor box (1) and the actuator box (2) of the device are non-detachable.

In one embodiment of the invention the sampling and sensor box (1) and the actuator box (2) of the device are detachable by providing suitable coupling members.

FIGS. 1-6 show and describe the structure and function of the device of this embodiment.

In one embodiment, the portable SMART IoT device and system of the present invention is as shown in FIGS. 1-16.

Figure 15:
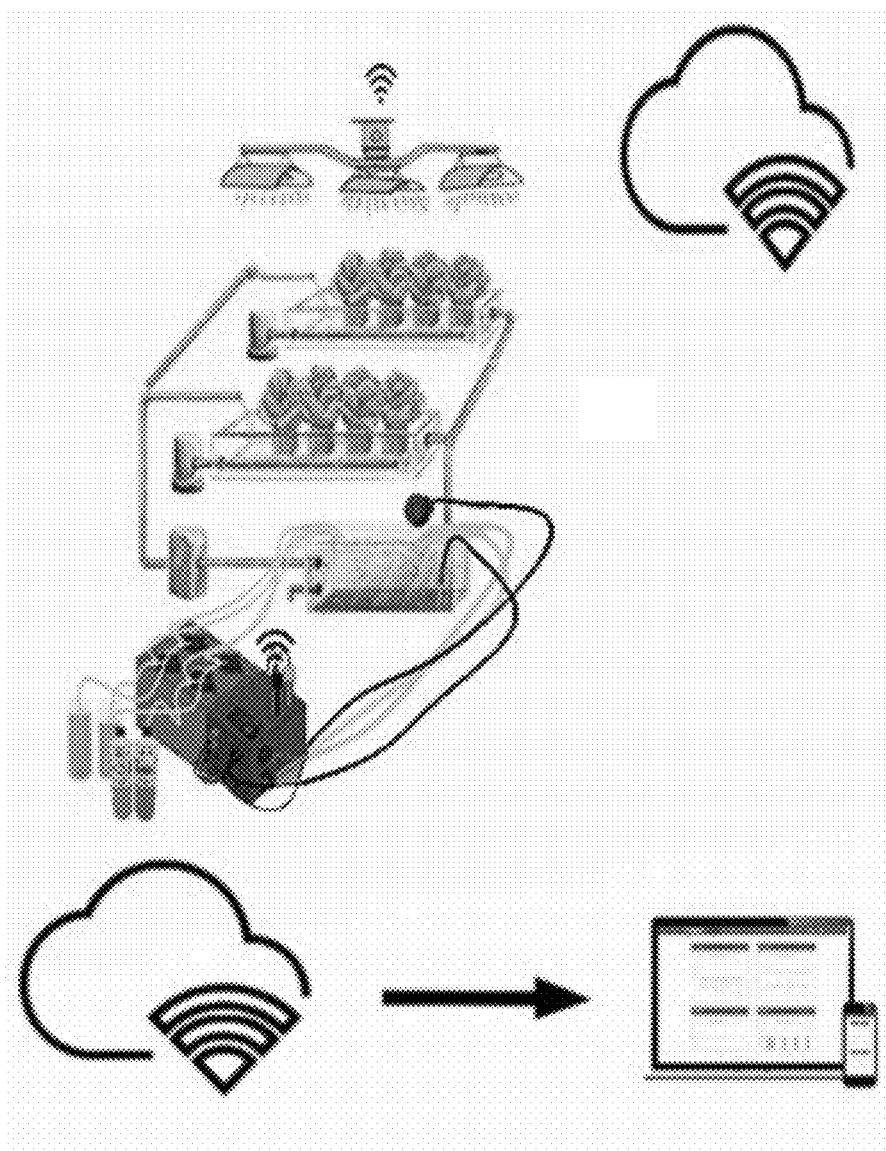
FIG. 15: Shows SMART IoT System in Action—Application in Agriculture Industry (with Device of FIG. 1, FIG. 7a).

Referring FIG. 1, it shows the outline of the SMART IoT device and system of the present invention in use as shown in FIG. 15. The device and system as shown comprises two main compartments:

As shown in FIG. 1 and also FIG. 15, the SMART IoT device comprises two compartments (1,2).

Compartment 1: Sampling and Sensor Box (1)

This compartment of the device performs the sampling and measuring function of the device. As shown in FIG. 1, it comprises a chamber (5), one or more numbers of sample containers (6), sensors holding slots (7), measuring sensors (8), sampling pipe connections (9), sampling motors (10).

In another embodiment the device of FIG. 1 is for two or more parameters. In this embodiment the chamber (5) comprises a plurality of sample containers (6) each respectively for measurement of a plurality of parameters (n). Thus, in the case of multiple parameters, the device comprises sampling motors (10a, 10b . . . 10n), which helps draw the samples (50a, 50b, . . . 50n) from the sample sources (53) of the Application System (51) into the sample containers (6a, 6b, . . . 6n) provided in a chamber (5) of the sampling and sensor box (1). Sampling pipe connections (9) each connected with sampling motors (10a, 10b, 10n) respectively connect the respective sample containers (6a, 6b, 6n) with sample sources (53) for inlet and outlet of samples (50a, 50b, 50n) of one or more application system (51) at filed of application (52) where one or more parameters are desired to be monitored, analyzed, and stabilized.

a. The containers (6) in the chamber (5) rest the samples (50) for a few minutes to stabilize. Preferably, the samples rest for 1-5 minutes, more preferably rest for 1-2 minutes.

b. The compartment has sensor holding slots (7) to hold the measuring sensors/devices (8) such that the sensing element of sensor (8) remain dipped inside the sample containers (6). These devices i.e. sampling motors, sensors are activated, as per the logic fed in the controller.

c. The measuring sensors/devices (8) are connected to Compartment 2.

Compartment 2: actuator box (2)

a. The device compartment (2) comprises actuators (11), dousing motors (13), dousing containers (12) for holding dousing liquids (15). A plurality of such dousing liquids (15) can be stored in the dousing containers (12) externally as per requirement and as per numbers of parameters to be stabilized.

For the case of multiple parameters using multiple sensors, the device comprises actuators (11a, 11b, . . . 11n); dousing containers (12a, 12b, . . . 12n) which are external to actuator box (2) for holding dousing liquids (15a, 15b, . . . 15n), douser Motors (13a, 13b, . . . 13n) respectively actuators outlet pipes (14) respectively connect and draw dousing liquids from the dousing containers (12) and add into the respective sample sources (53) of one or more application system (51) at site of application (52) where one or more parameters are desired to be stabilized.

The number of parameters, sensors and other components as represented by a,b, . . . "n" wherein "n" represents plurality wherein "n" is a number of the number system such as n=1, 2, n.

The device also comprises
a control panel module (24) for user input and indication. It comprises reset button (24.1), calibration button (24.2), save button (24.3), LED indicator (24.4) and ON/OFF switch (24.5).
a wireless network communication system (25);
one or more controllers (26), provided with a set of instructions (38) wherein the set of instruction (38) can be a set of predefined instruction (22) such as logic (41) and Algorithm (42) stored in a memory to control and to operate the device to perform all the functions of the IoT device autonomously for continuous monitoring and stabilization of desired parameters; and
one or more circuit boards (27) which electrically connects measuring sensors (8), sampling motors (10), actuators (11), douser Motors (13), motor driver (60), control panel module (24), wireless communication module (25), controller devices (26), USB port (28), power supply module (29) and display (61).
b. The compartment (2) comprises a PCB (27) which consists of slots to hold the female pins for the measuring sensors/devices (8). One end of the measuring devices is connected to the female pins, and the other end are inserted in slots (7) of compartment 1.
c. The measuring devices (8) are connected through various ports, sensors and regulators to the processor/controller (26).
d. The processing controller (26) has the predefined set of instruction (22) which is a proprietary logic (41), which takes the inputs from measuring devices (8), analyses with the standards (32), and relays the output to the cloud server (30).
e. The logic (41) also determines, based on the analysis, the activation of the actuators (11).
f. The actuators (11) helps stabilizes the Application System, as per inputs from logic (41).
g. The compartment has a battery system (43), and the wireless communication module (25) includes a Wi-Fi system (44) to help continuous operations and to connect to cloud (30), actuators (11) and mobile app (35).

Figure 2:
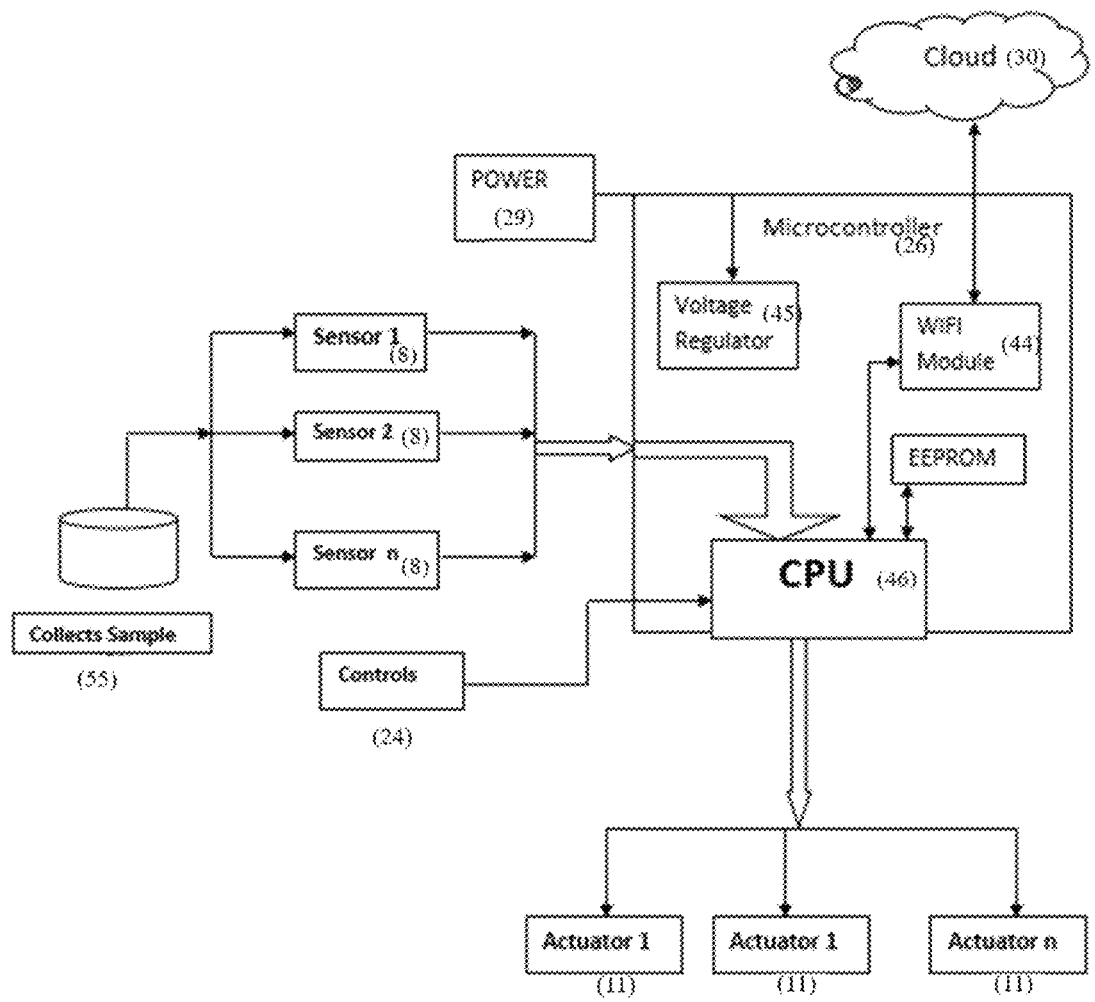
FIG. 2: Shows the Line diagram of the device and system of FIG. 1.

Referring FIG. 2, it shows a line diagram of the device and system of the present invention showing different structural components and their arrangement in the device and system of the present invention as shown in FIG. 1. As shown the device microcontroller (26) which comprises CPU (46) which is connected with sample collection module (55) via multiple sensors (8n) ("n" numbers); controls in control panel (24); power module (29); WI-FI Module (44) for cloud communication (30); and multiple numbers of actuators (11n) ("n" numbers).

Figure 3:
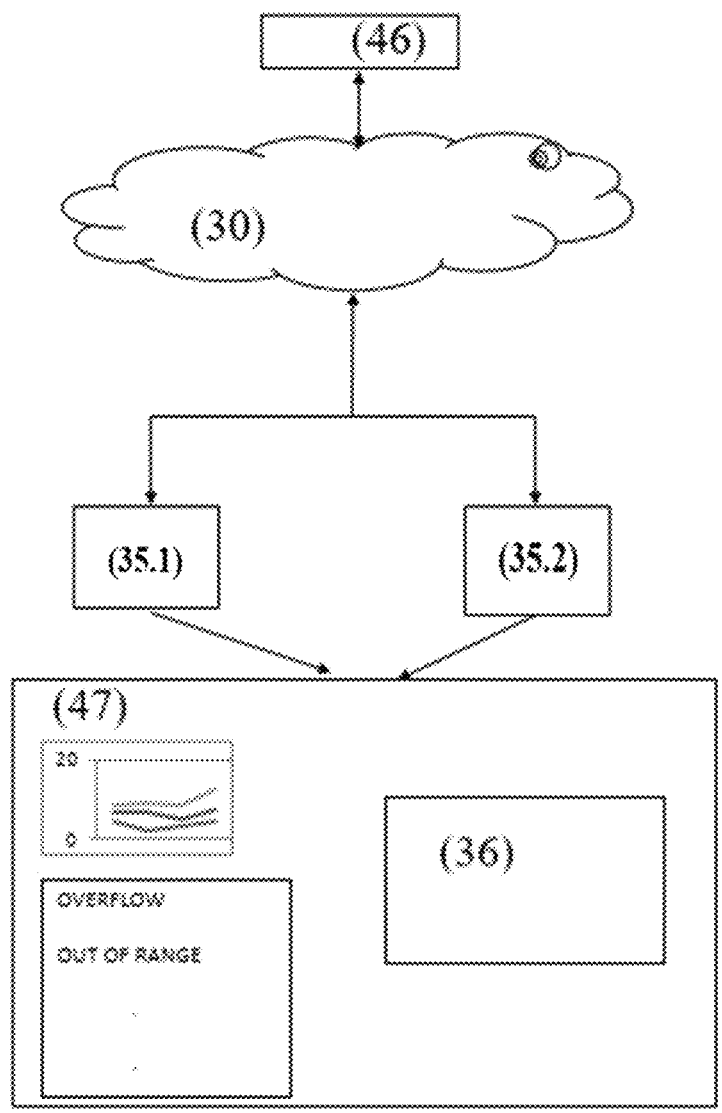
FIG. 3: Shows an example of flow of data/information in the device/system of the present invention.

Referring FIG. 3, it shows the flow of data/information in the device/system of the present invention. As shown, the user inputs data (36) is fed from the mobile app (35.1) and/or the computer (35.2) which are connected with monitoring interface (47). The input data are then communicated to microcontroller (26) via could communication (30).

Figure 4:
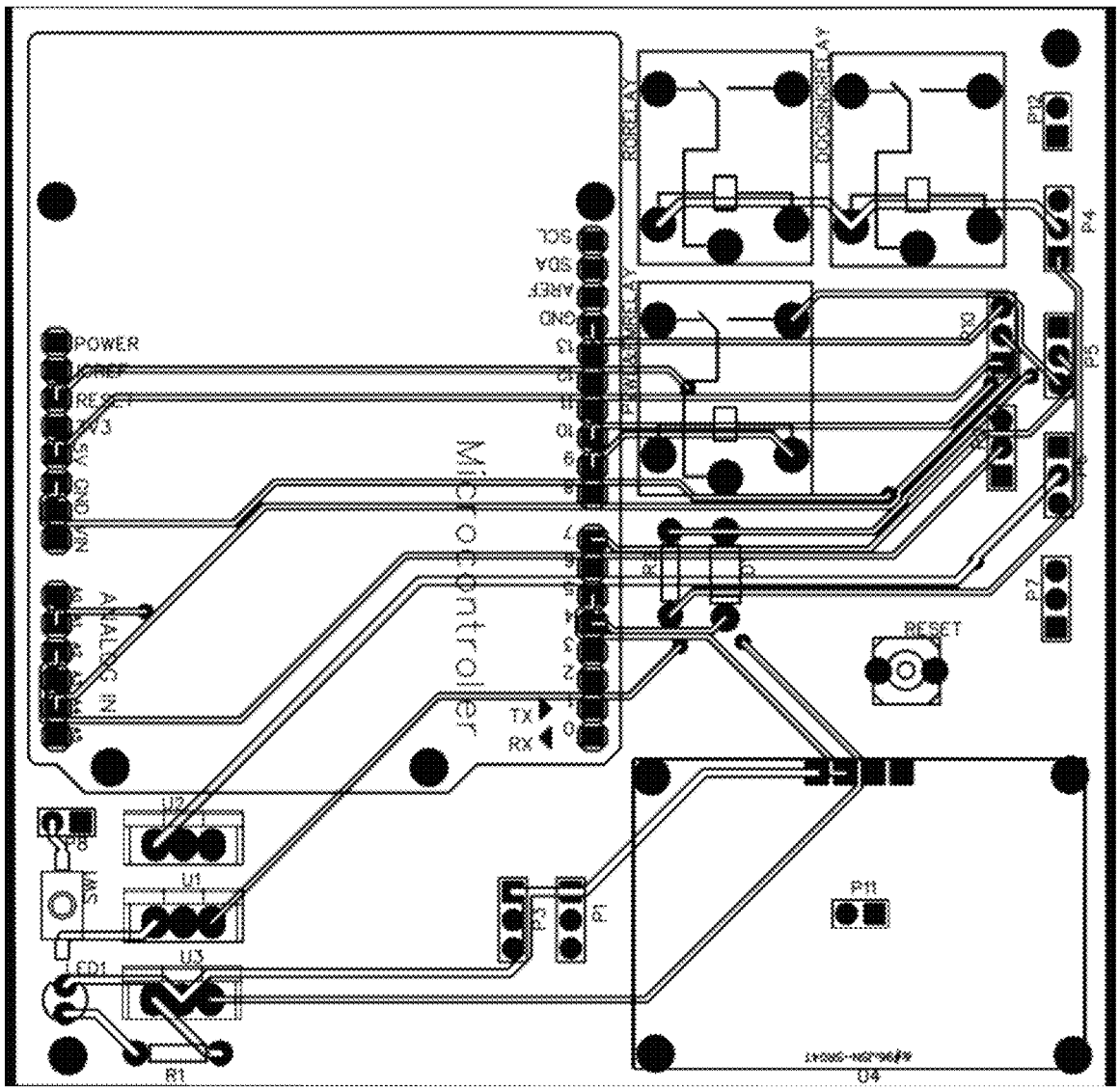
FIG. 4: Shows the Top View of the circuit board layout of the device/system of FIG. 1.
Figure 5:
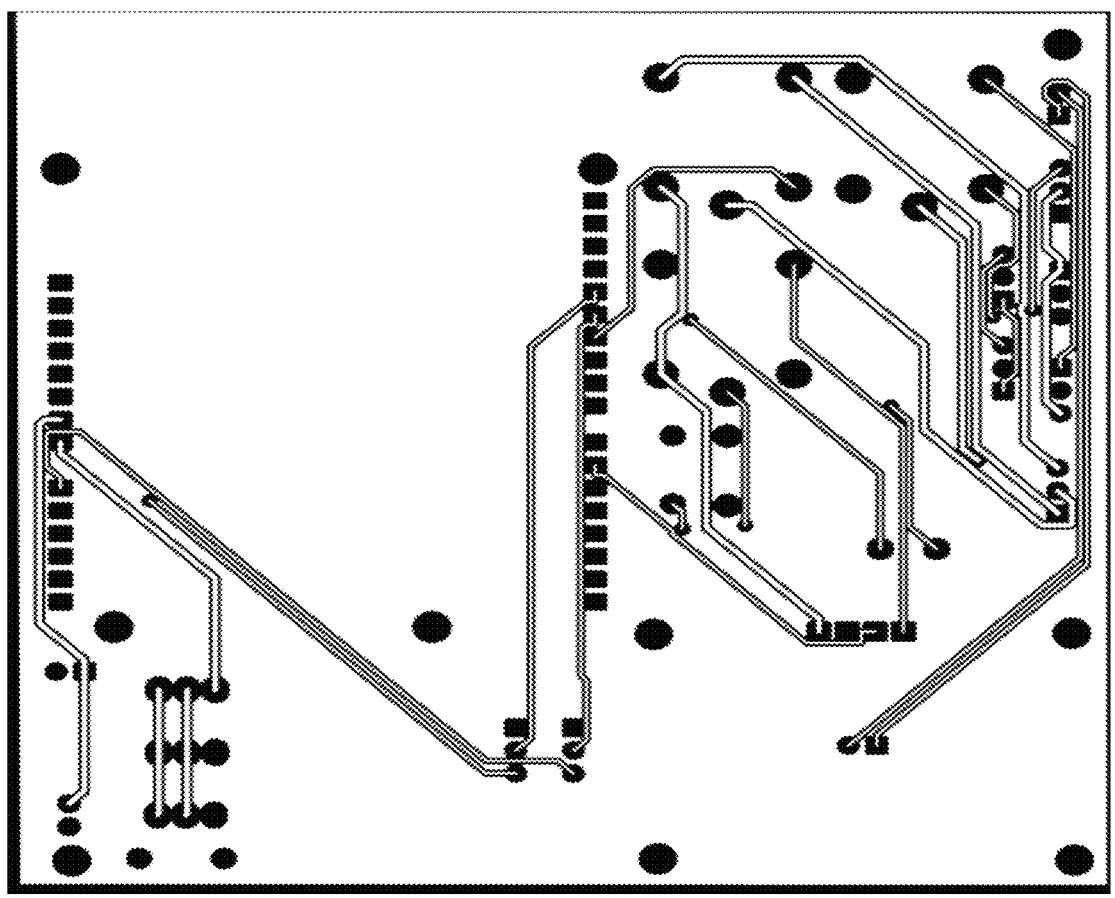
FIG. 5: Shows the Bottom View of the circuit board layout of FIG. 4.

Referring FIGS. 4-5, respectively it show the Top View and Bottom View of the circuit board layout i.e. PCB (27) implemented in the device/system of the present invention.

The circuit board (27) is placed in the actuator box (2). The PCB board (27) comprises input ports P1, P3, P4, P5, P12, and U4. These are the input ports for the sensors (8) to read the data measured by the sensors (8). Sensors may be based on the application.

The circuit board (27) comprises output ports P6, P7 for Actuators (11) which acts based on the results of input data analysis.

The circuit board (27) also comprises voltage regulators ICs (45) at ports U2, U3, U4 to maintain the constant voltage across the device and for other circuits.

The circuit board (27) also comprises a switch port SW1. It is a switch port to connect the ON/OFF switch (24.5) of the device which is used to power ON and Power OFF the device.

The circuit board (27) also comprises ports P9 and P10 which are the control ports where the reset button (24.1) is connected. These are to reset the device or to calibrate the sensors and save the calibrated values.

The circuit board (27) also comprises power input/supply port P8 to power up the device wherein the power supply module (29) and/or the battery power (43) is/are attached.

Figure 6:
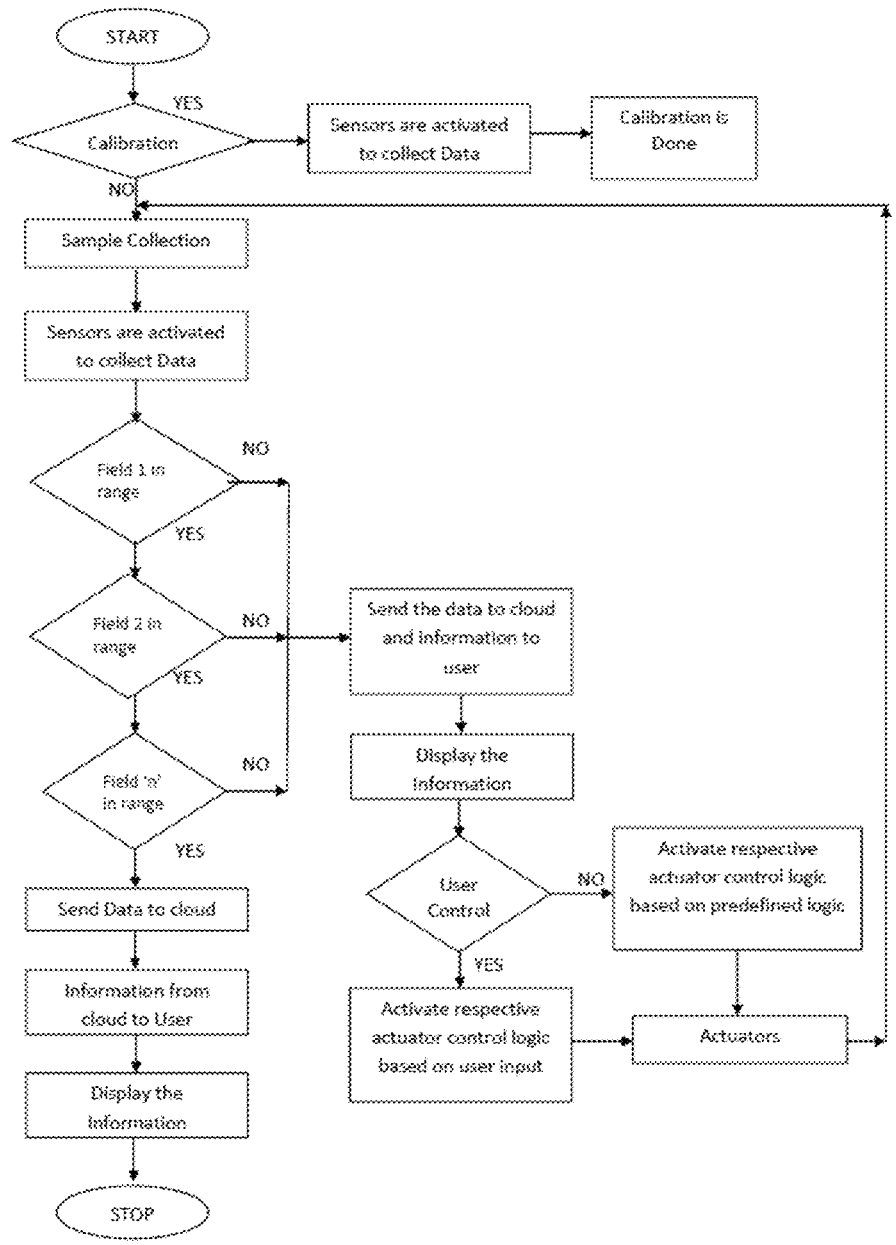
FIG. 6: Shows A logical flow diagram for the operation of the device/system of FIG. 1.

FIG. 6 presents a logical flow diagram for the device/system of the present invention as shown in FIG. 1. The set of instructions (38) which are fed in the controller are either predefined set of instructions (22) fed in controller memory as logic (41) and/or algorithm (42) or user input instruction (36) provided by user (19).

The FIG. 6 shows an example of a logic (41) which is fed in the controller memory of the device of FIG. 1.

After deploying the SMART IoT device at the application field (52) and connecting all the connections for the sampling system, measuring, and wireless communication network system (25), the device is switched ON and the monitoring function starts by the device.

Sample collection: the sampling motors (10a, 10b, . . . 10n) draws samples (50a, 50b, 50n) from the sample source (53) into the sample containers (6a, 6b, 6n) of the chamber (5).

Measuring sensors (8a, 8b, 8n) take measurements (Ma, Mb, . . . Mn) respectively for respective field source samples and send the data to controller where the measures values are compared with standard values (32) and when the measured values are within the range of the preset standard values (32) (YES), the controller send the data to cloud via Wi-Fi module (44) and store at cloud (30) and display the results and also send to user (19) from cloud (30); and when the measured values (31) are not within the range of the preset standard values (32) (NO), the controller send the data to cloud (30) via Wi-Fi module (44) and store at cloud (30) and display the results and also send to user (19) from cloud (30) wherein either user input set of instruction (36) or a preloaded predefined logic (41) activates the respective actuators (11);

Stabilizing the parameters by adding respective douser liquids (15) stored in the external dousing containers (12) of the actuators box (2) via the douser pumps (13), into the sample source (53) where the deviation in parameters observed.

FIGS. 7-10:

In one embodiment invention provides a SMART IoT device which two main circuit boards (two PCBs (27a, 27b)) wherein one main PCB (27a) is for sampling and sensor box (1) and another main PCB (27b) for actuator box (2). In this embodiment, the actuator box (2) of the device is detachable from the sampling and sensor box (1). FIGS. 7-10 show and describe the structure and function of the device of this embodiment.

Figure 7A:
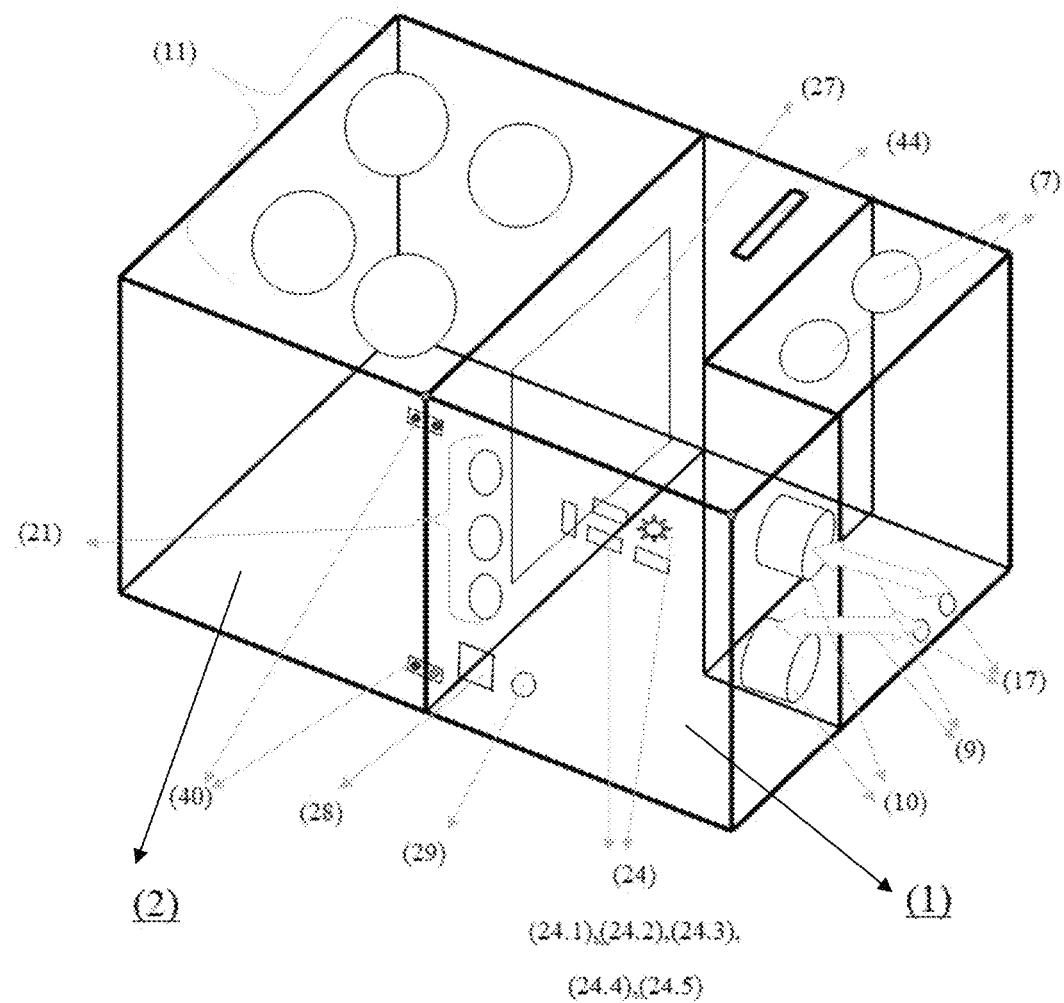
FIG. 7a: Shows the outline of the SMART IoT device and system of another embodiment of the present invention [with Detachable Actuator Box (2)].

FIG. 7a shows the outline of the SMART IoT device and system of another embodiment of the present invention wherein the Actuator Box (2) is detachable from the SMART IoT device.

Referring the FIG. 7a and also FIG. 15, the device comprises a sensors and sampling box (1) and a detachable actuator box (2), both are detachably coupled by detachable couplers (40). One of the advantages of this device is that the actuator box (2) can be detached from the SMART IoT device when such a requirement is in need. In this this device each of the compartment boxes (1,2) comprises separate independent main PCBs such as main PCB (27a) for sensors and sampling box (1) and main PCB (27b) for the detachable actuator box (2) and communication modules like separate Wi-Fi module (44) which enables the device to work both in combined mode and also in detachable mode.

Compartment 1: The Sensor and Sampling Box (1)

Similar to SMART IoT device of FIG. 1, the Sensor and Sampling Box (1) of the device of FIG. 7a performs the sampling and measuring function of the device. As shown in figure, it comprises a chamber (5), one or more numbers of sample containers (6), one or more sensors holding slots (7), one or more measuring sensors (8), sampling pipe connections (9), sampling motors (10).

The device may be designed with system for monitoring two or more (n numbers) of parameters (P)wherein said key controllable parameters (P) are selected from pH, EC, Temperature, Liquid Levels, Light Luminosity, Liquid Flow Rate, Dissolved Oxygen and Carbon Dioxide.

In one embodiment the device of FIG. 7a is for "n" numbers of parameters.

In one embodiment the device of FIG. 7a is for two parameters.

In another embodiment the device of FIG. 7a is for two or more parameters involving two or more sensors. In this embodiment the chamber (5) comprises a plurality of sample containers (6a, 6b, . . . 6n) each respectively for measurement of a plurality of parameters (n numbers). Thus, in the case of multiple parameters, the device comprises sampling motors (10a, 10b . . . 10n), which helps draw the samples (50a, 50b, . . . 50n) from the sample source (53) of the Application System (51) into the sample containers (6a, 6b, . . . 6n) provided in a chamber (5) of the sampling and sensor box (1). Sampling pipe connections (9) each connected with sampling motors (10a, 10b, 10n) respectively connect the respective sample containers (6a, 6b, 6n) with sample source (53) for inlet and outlet of samples (50a, 50b, 50n) of one or more application system (51) at site of application (52) where one or more parameters are desired to be monitored, analyzed, and stabilized. The motor used is peristaltic pump.

The containers (6) in the chamber (5) rest the samples (50) for a few minutes to stabilize.

Preferably, the samples rest for 1-5 minutes, more preferably rest for 1-2 minutes.

The compartment has sensor holding slots (7) to hold the measuring sensors/devices (8) such that the sensing element of sensor (8) remain dipped inside the sample containers (6). These devices i.e. sampling motors, sensors are activated, as per the logic fed in the controller.

The Sensor and Sampling Box (1) further comprises a control panel module (24) for user input and indication. It comprises reset button (24.1), calibration button (24.2), save button (24.3), LED indicator (24.4) and ON/OFF switch (24.5).

a wireless communication module (44) which includes Wi-Fi system (44.1);

one or more controllers (26), configured with a set of instructions (38) which includes logic (41) and Algorithm (42) stored in a memory to control (26) and to operate the device to perform all the functions of the IoT device autonomously for continuous monitoring and stabilization of desired parameters;

a main PCB (27a) comprising the controller (26) (FIGS. 8a-8b); and a PCB (27c) for control panel module (24) (FIGS. 9a-9b) connected with the main PCB (27a);

The main PCB electrically connects measuring sensors (8), sampling motors (10), control panel module (24), wireless communication module (44), controller devices (26), USB port (28), power supply module (29).

1. Liquid Parameter Sensor and Sampling Box
  a. It can have one device Box that measure key parameters of Liquid. The device box comprises of slots to hold the measuring equipment(s)/Sensors (8) for measuring the static liquid parameters e.g. EC, PH, etc. It can hold up to minimum two devices.

All sensors are connected in the circuit and works as explained in the Circuit System below. It has the unique liquid stabilizing system wherein:
  i. The Device system motor (10) draws the liquid sample (50) from the source (53) (of liquid whose parameters are to be measured),
  ii. The unique piping system (9) ensures that there is no water spillage in the circuit and the pipes have slots in the device box.
  iii. The liquid sample (50) is stored in the various slots in containers (6) available for each of the sensors (8).
  iv. This unique system of slot (7)/container (6) for each of the sensors (8) ensures that the readings are not disturbed by device currents.
  v. The timings of the sampling motors (10) are such that the liquid sample is held in the slots (7)/container (6) for a few minutes to allow to stabilize.
  vi. The sensor (8) takes measurements.
  vii. The sample motors (10) are then reversed and it drains the liquid sample (50) back to the source (53).
  b. Reset System (24.1)
This Liquid parameter(s) sensor and sampling box (1) also has a reset system provided in the control panel module (24) wherein a reset button (24.1) is provided, which helps to reset the parameters to stable condition. There are possibilities of measurement getting deviations (33) after a period of time of using, and hence this reset system ensures resetting of the parameters to the standard (32).
  c. The Circuit (27)
As briefly described above, Box (1) comprises multiple circuits which are—the main module PCB (27a), the user input module PCB (27c), the sensors module (27d).
  i. The main module PCB (27a) (FIGS. 8a-8c) is, where the footprints of Arduino or Raspberry Pi is printed on the PCB along with the power supply circuitry and the sample collector motor drivers (60). There is also a USB connector (28) to connect it to the computer. The power supply circuitry has the voltage converters in it. The sampling motors are driven by the motor drivers (60) on the main module.
  ii. The user input module PCB (27c) (FIGS. 9a-9c) is a small PCB that contains the reset (24.1), ON/OFF (24.5), and a few input buttons. This is connected to the main module through the FRC cables. The user input module can also be a touch display module (61).
  iii. The sensor module (27d) is connected to the sensor input pins of the main module. The analog data received by the sensor input pins are converted to digital format inside the Arduino or Raspberry Pi and used for calculations according to the algorithm (42). These sensor modules can be interchangeable with few changes in the Algorithm (42) based on applications.

iv. This entire data is sent to the cloud (30) using the WIFI module (44.1) which is connected to Arduino or Raspberry Pi on the main module PCB (27*a*).

v. The uniqueness of the system is that where Wi-Fi module (44.1) cannot be connected to cloud (30), it can be replaced by localized solution (local wi-fi/Zigbee) as communication module (44.3) to ensure data goes to local server. The arduino or raspberry pi controller (26) in the main (27*a*) can be replaced with customized IC and Zigbee. This is optional and it reduces the cost considerably. When the volumes are high, this can be used to reduce cost.

d. The Algorithm/Logic

Once the System is set to start and powered on, the Algorithm starts to work as below:

i. the Liquid Stabilizing System starts to operate, as mentioned above.

ii. the Liquid Stabilizing motors (10) start to operate again, and drains the liquid sample (50) back to source (53).

iii. The sensors (8) for EC, PH, liquid temperature, etc. record the readings i.e. measures parameter value (31) in each cycle of liquid stabilizing system.

iv. These readings measured value (31) are then stored in cloud (30). One example of cloud (30) is ThingSpeak. (ThingSpeak is an open-source Internet of Things application and API to store and retrieve data from things using the HTTP and MQTT protocol over the Internet or via a Local Area Network). Other available cloud can also be used. In one embodiment, the invention uses ThingSpeak as cloud (30). In one embodiment, the invention uses separate, independent cloud specifically developed for present invention.

v. The readings measured values (31) can be displayed as individual readings, or graphs to show the continuous readings (measured value (31).

vi. These readings are also available to be displayed on the user interface (35) such as computer or mobile app in indicative color.

vii. The logic (41) of the Algorithm (42) of the Circuit PCB (27*a*), compares this with the set standard limits (32) for these device readings measured value (31).

viii. After the recording is concluded, the Liquid Stabilizing motors (10) start to operate again, and drains the liquid sample (50) back to source (53).

ix. This cycle is repeated at a preset time interval which is normally, after every 5 minutes, which ensures continuous measurement.

The Detachable Actuator Box (2)

Referring FIGS. 7*a*-7*d* and 10*a*-10*b*, and also FIG. 15 the device compartment (2) comprises actuators (11), dousing motors (13), dousing containers (12) which are external to Detachable Actuator Box (2) for holding dousing liquids (15). A plurality of such dousing liquids (15) can be stored in the device as per requirement and as per numbers of parameters to be stabilized.

For the case of multiple parameters and sensors, the device comprises actuators (11*a*, 11*b*, . . . 11*n*); dousing containers (12*a*, 12*b*, . . . 12*n*) for holding dousing liquids (15*a*, 15*b*, . . . 15*n*), douser Motors (13) respectively actuators outlet pipes (14) respectively connect and draw dousing liquids from the dousing containers and add into the respective sample sources (53) of one or more application system (51) at site of application (52) where one or more parameters are desired to be stabilized;

a. The logic (41) and Algorithm (42) in circuit (27*a*) compare the measured readings values (31) with the standards (32), as explained in the details of the circuits of the sensor and sampling devices box (1) above. Based on the deviations (33) from the standard (32) in these parameters, the DETACHABLE ACTUATOR BOX (2) is triggered to help activate the actuators (11) for right dousing of the needed dousing liquid (15).

This DETACHABLE ACTUATOR BOX (2) can also be termed as the slave device, which gets its inputs from the Master device(s) (Parameter Sensor and Sampling box (s)).

If the SENSOR and SAMPLING BOX (1) is the Master & Heart of the System, the DETACHABLE ACTUATOR BOX (2) is the Slave & Mind of the System.

i. Based on the various parameters which needs to be maintained in the Main System Liquid at source, the box (2) draws liquid correcting dousers (15) from external douser containers (12) for correction and stabilization of PH, EC, etc. Key parameters like PH, EC, etc., can be maintained in the system through this device box (2).

These DETACHABLE ACTUATOR BOX (2) are depending on the Industry and can be varied on the parameters that need to be maintained for that Industry. Each DETACHABLE ACTUATOR (2) can draw externally stored liquids that helps stabilize the system.

Figure 10A:
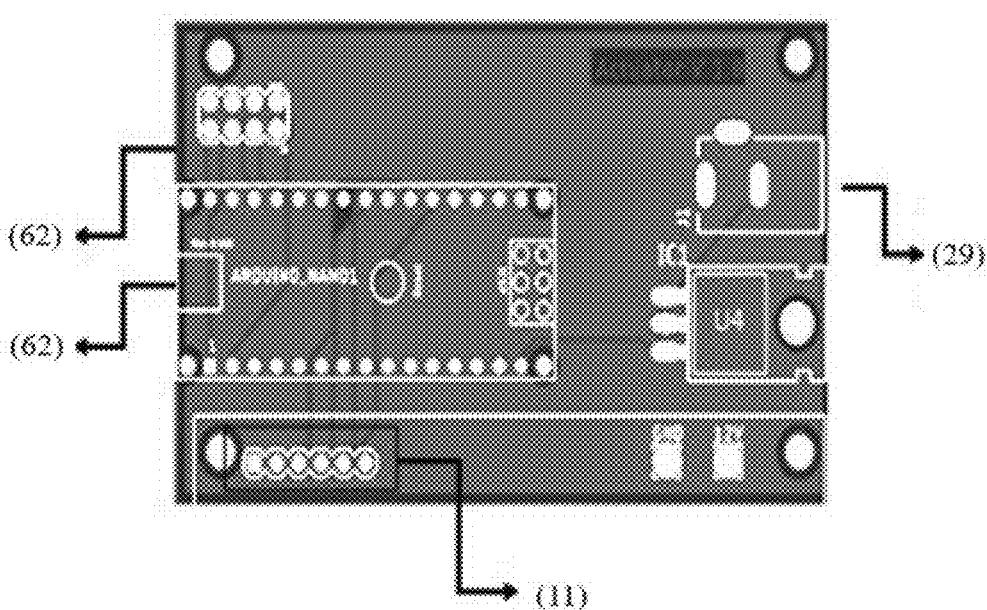
Figure 10B:
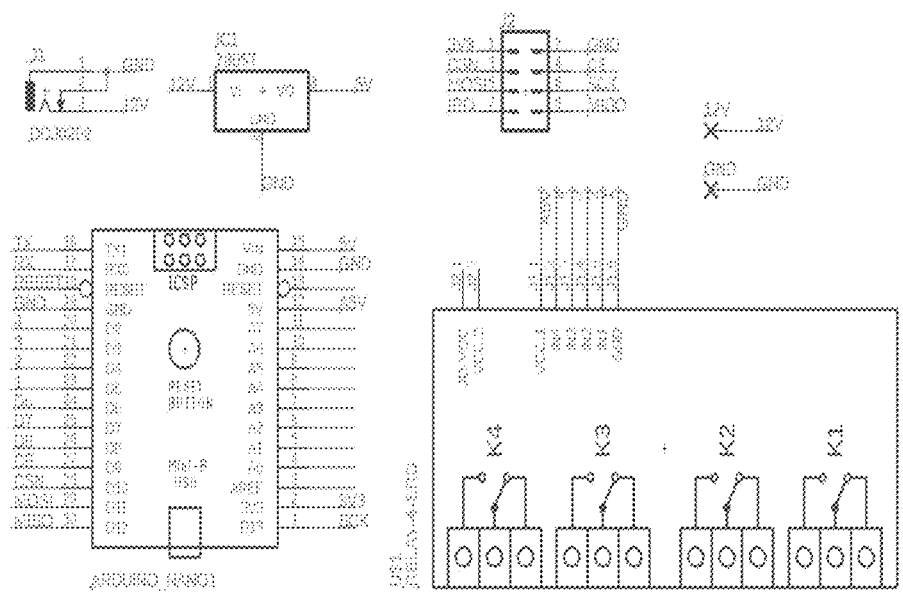

This Detachable Actuator Box (2), has slots to hold various douser motors (13). It can hold minimum of two dosers. All dosers are connected in the circuit, and works as explained in the Circuit System below.

b. The Circuit (27*b*) (FIGS. 10*a*-10*b*)

The Circuit i.e. the main PCB (27*b*) is the heart of all this Detachable Actuator Box (2).

i. The Detachable Actuator module PCB (27*b*) also has the same circuitry as the main module PCB (27*a*) of box (1) excluding the sensors module (8) and user input module (24). The WIFI module (44.2) is connected to the Arduino of the PCB (27*b*). The Relays (16) in the actuator module drive the dosing motors (13) based on the input from the Arduino controller (26). This Actuator module (11) is also interchangeable based on the applications.

ii. This entire data is sent to the cloud (30) using the WIFI module (44.2) which is connected to Arduino or Raspberry Pi on the main module PCB (27*b*).

iii. The uniqueness of the system is that where Wi-Fi module (44.2) cannot be connected to cloud (30), it can be replaced by localized solution (local wi-fi/Zigbee) as communication module (44.3) to ensure data goes to local server. The arduino or raspberry pi controller in the main (27*a*) can be replaced with customized IC and Zigbee. This is optional and it reduces the cost considerably. When the volumes are high, this can be used to reduce cost.

c. Once the System is set to start and powered on, the Algorithm starts to work as below:

i. The logic (41) of the Algorithm (42) of the various Sensor device(s) Circuit, compares the readings of the various parameters (P) with the set standard limits for these device readings, and stores these in the Cloud (30).

ii. The Key parameters (P) of the Industry, which help stabilize the system, and which can be corrected by the Dousers, are specifically looked into by the Algorithm (42) of the Dousing Box Circuit (27b).

iii. Once the Circuit (27b) gets a signal for the deviation (33) of key parameter based on point i., it activates the corresponding actuator (11) douser liquids (15). The Communication Port helps in connecting to the Wi-Fi of the system (44), and in receiving the deviation data from the cloud (30).

iv. The Douser in the actuator box douses the corresponding dousing liquid (15), needed to stabilize that parameter. The dosage quantity is calculated in the Algorithm, based on the deviation, and amount needed to correct the deviation. This logic (41) is set in the Algorithm (42), and various logics can be loaded for various parameter, depending on the Industry parameter to be maintained.

v. The Parameter Measuring device/sensors (8) in the Measuring Box (1) checks the parameter, and records in the cloud (30). If the deviation (33) is recorded still, the steps of point iii, and iv are repeated again.

vi. This cycle is repeated at a preset time interval which is normally, after every 5 minutes, which ensures continuous stability of the system.

Figure 7B:
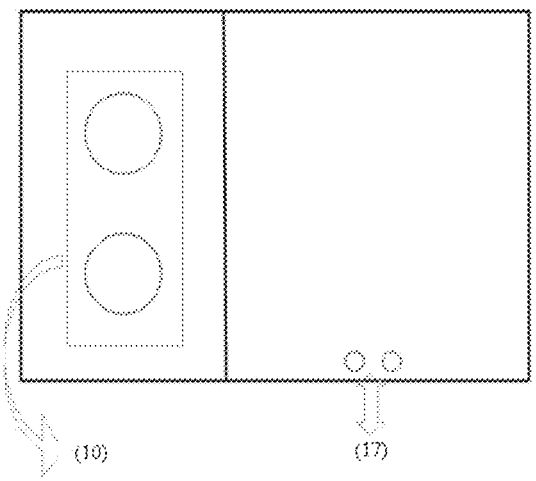

FIG. 7b shows the Front Side View of SMART IoT device of FIG. 7a.

As can be seen in figure
in the left side of the front side view of device, the device comprises sampling motors module (10) which comprises motors (10a, 10b, ... 10n). In one embodiment, the motors (10) are peristaltic pump; and
in the right-side of the front view of device, the device comprises two a sample inlet and outlet module (17) which comprises ports (17.1) and (17.2).

Figure 7C:
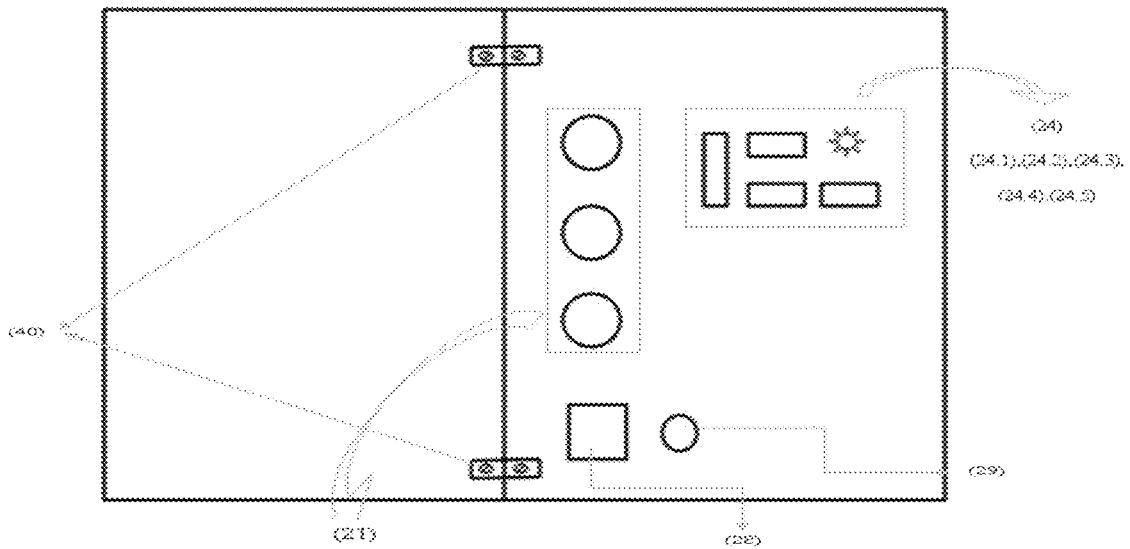

FIG. 7c shows the Left Side View of device of FIG. 7a.

As can be seen in figure in the middle, it comprises detachable couplers (40.1, 40.2) coupling box (1) and box (2). In the right side portion of FIG. 7c, it comprises
sensor module with ports
a control panel module (24) with reset button (24.1), calibration button (24.2), save button (24.3), LED indicator (24.4) and ON/OFF switch (24.5).
a USB port (28),
a power supply module (29)

Figure 7D:
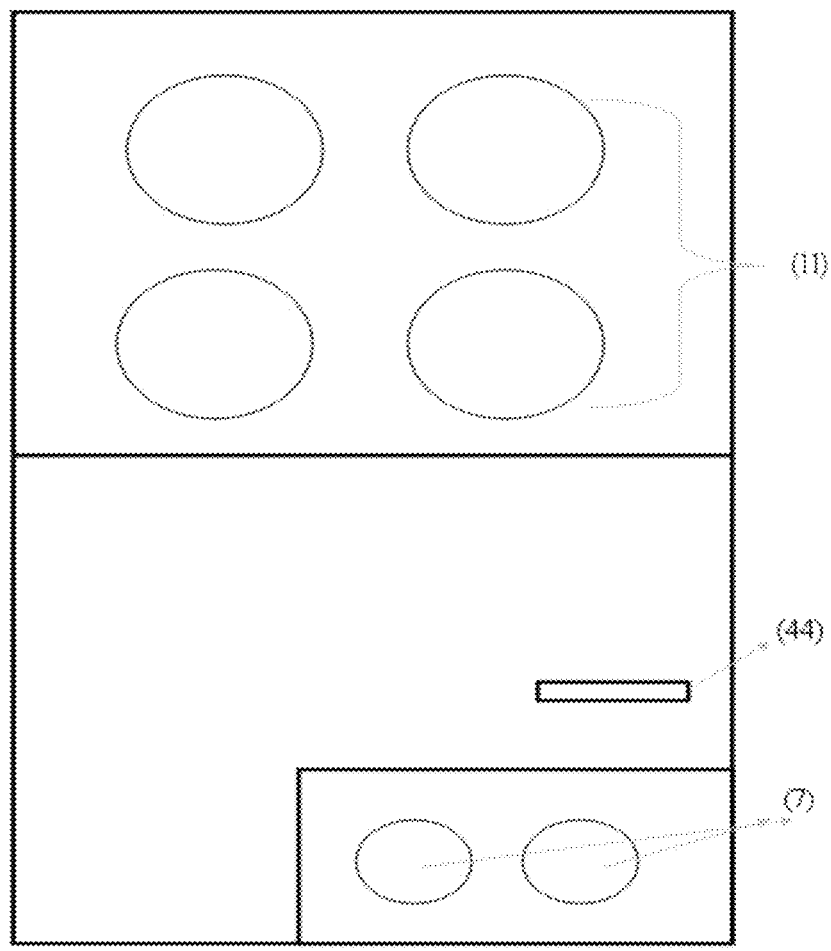

FIG. 7d shows the Top Side View of device of FIG. 7a.

In the bottom side of FIG. 7d as shown, it shows sensors holders (7) with holding slots (7a, 7b, ... 7n) inside a chamber (5) and Wi-Fi module (44) in box (1).

In the upper side of FIG. 7d as shown, it shows box (2) comprising actuators (11a, 11b, ... 11n).

Sensor and Sampling PCB

Figure 8A:
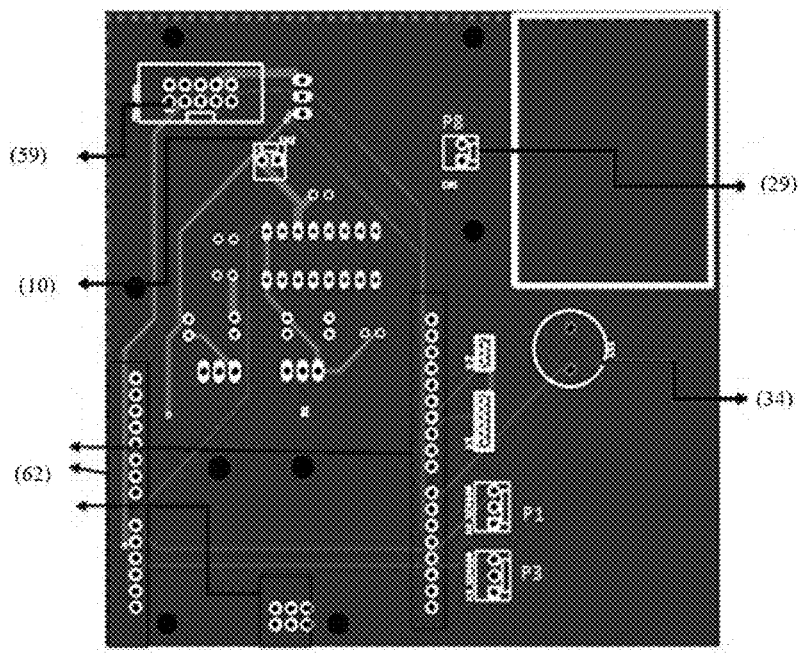

FIG. 8a: Top Side View of PCB of Sensor and Sampling Box (1) of Device of FIG. 7a.

P1, P3 are the input terminals to which sensors like EC, pH, are plugged in respectively.

P8 is the terminal to which power source is connected. Power source can be battery or a direct dc power supply.

Figure 8B:
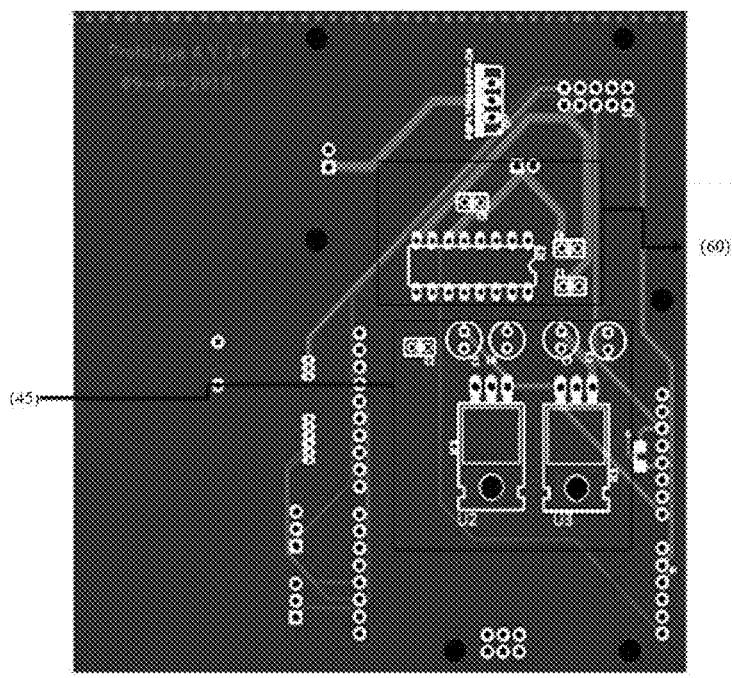
Figure 8C:
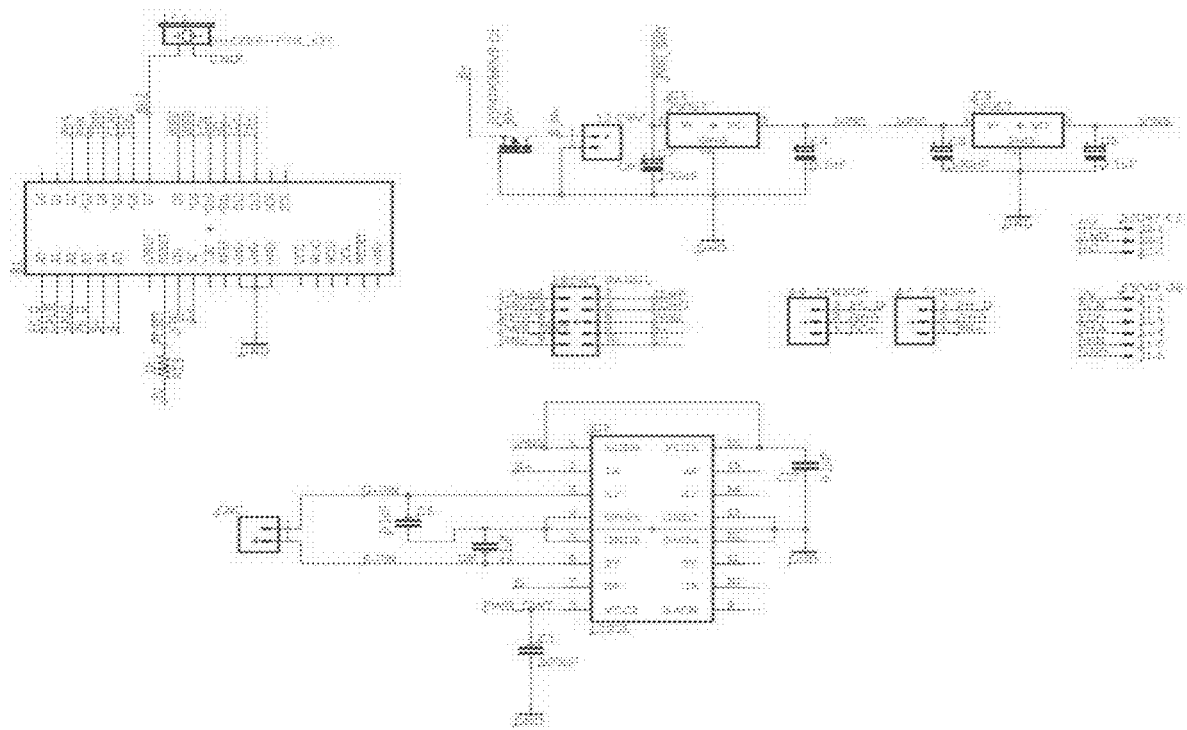
FIG. 8c: Shows the Schematic of PCB of FIGS. 8a-8b.

FIG. 8b: Bottom Side View of PCB of Sensor and Sampling Box (1) of Device of FIG. 7a U2, U3 the voltage regulators to which the terminal P8 is connected. The regulated power is then supplied to the entire PCB Sensor and Sampling Control Panel PCB FIG. 9a: Top Side View of Control Panel PCB (User Input) of Device of FIG. 7a FIG. 9b: Bottom Side View of Control Panel PCB (User Input) of Device of FIG. 7a P4, P5 are the input terminals to which sensors like Temperature, Ultrasonic are plugged in respectively.

P9 and P10 are the terminals to which the calibration and save switches are connected, so user can use those switches to control the device SW1 is the name of the switch port on the PCB where the ON/OFF switch is connected to power on and power off the device.

Detachable Actuator PCB (FIGS. 10a-10b)

FIG. 10: Top of Side View of PCB Detachable Actuator Box (2) of Device of FIG. 7a U4 the voltage regulators to which the terminal P8 is connected. The regulated power is then supplied to the entire PCB.

Peripheral (Additional) Sensor Boxes for SMART IoT Box (3)

In another embodiment the SMART IoT device in addition to the Liquid Parameter Sensor and Sampling Box (1) for measuring function, the device optionally comprises one or more peripheral sensor boxes (3) as additional Masters, which can be used to measure Atmosphere parameters, Soil parameters, etc.

In one embodiment, the device comprises one or more peripheral sensor boxes (3).

The peripheral sensor boxes (3) may be selected from Atmosphere Parameter Sensor Box (54), Soil Parameters Box (58).

In one embodiment the device additionally comprises Atmosphere Parameter Sensor Box (54) as the peripheral box (3).

Figure 11A:
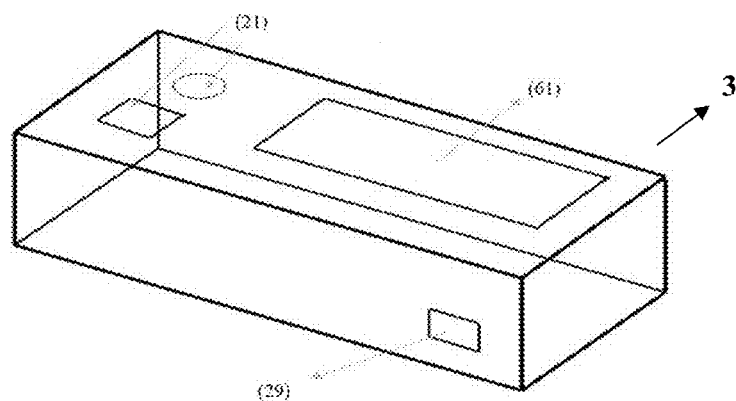
FIG. 11a: Shows the Atmosphere Parameter Sensor Box (3), peripherally can be attached to the device of present invention in another embodiment.
Figure 11B:
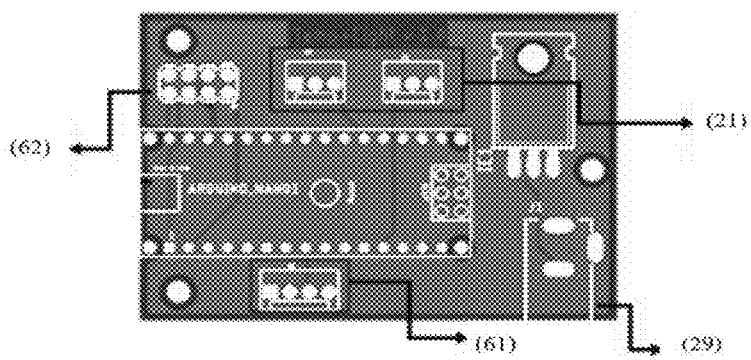
Figure 11C:
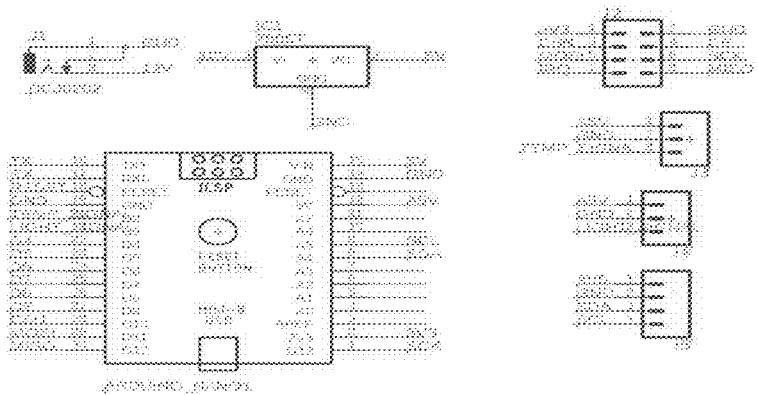
FIG. 11c: Shows the Schematic of PCB of FIG. 11b.

Atmosphere Parameter Sensor Box (54) (FIGS. 11a-11c)

FIG. 11a shows the Atmosphere Parameter Sensor Box (54).

The Atmosphere parameters like Temperature, Luminosity, Oxygen level, Co2, etc., can be measured through this device box.

This device box, like liquid parameter Sensor & Sampling Box (1), has slots to hold various Sensor devices. It can hold min. of 2 devices. All Sensor devices are connected in the circuit and works as explained in the Circuit System.

FIG. 11b shows the PCB of Atmosphere Parameter Sensor Box of FIG. 11a.

Additional Individual Parameter Sensor Boxes (4) for SMART IoT

In another embodiment the SMART IoT device, in additional to the two major Parameter measuring device boxes viz. Liquid Parameter Measuring Device (1), Atmosphere Measuring Device (54), there can be one or more additional individual measuring device Box (4), which can be installed at different locations and getting connected to the system of the SMART IoT device.

In another embodiment the said additional Individual Parameter Sensor Boxes (4) (FIGS. 12a-12c) may be selected from can be Height Measuring device (56), Flow rate Measuring device (57), Soil Parameter Measuring Device (58), etc.

In one exemplary embodiment, the Individual Parameter Sensor Box (4) is Height Measuring device which is shown in FIG. 12.

Figure 12A:
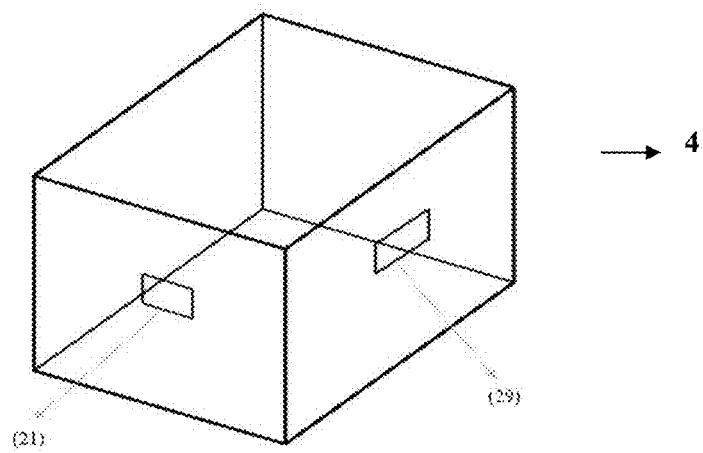
FIG. 12a: Shows Additional Standalone Height Measuring Sensor Box (4), remotely can be attached to the device of present invention in another embodiment.

FIG. 12a: Shows Additional Standalone Height Measuring Sensor Box (56), remotely can be attached to the device of present invention.

Figure 12B:
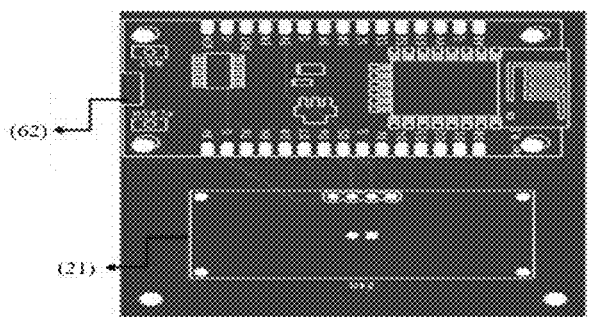
Figure 12C:
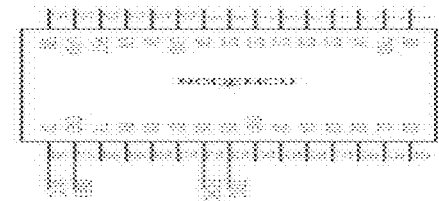
FIG. 12c: Shows the Schematic of PCB of FIG. 12b.

FIG. 12b: Shows the PCB for Standalone Height Measuring Sensor Box (56) of FIG. 12a.

The SMART IoT Connecting Network One Master—One Slave Network or Many Masters—One Slave Network One Master-Slave
- a. The Liquid parameters Sensor & Sampling Box (1) can be the One Master.
- b. This Liquid Parameters Sensor and Sampling Box (1) is connected through the Wi-Fi (44) to the other parameter sensor and sampling box (Air parameters Measuring Box, Height Sensor and Sampling Box, Flow rate sensor and Sampling Box, etc.).
- c. All measurement from the various parameters of Sensors are stored in the Circuit of the Liquid Parameter Sensor and Sampling Box (1), which in turn is stores the data in the cloud (30).
- d. The logic of the Algorithm for comparing the measurement of the devices with the standards (32), is stored in the Liquid Parameter Sensor & Sampling Box (1).
- e. The Detachable Actuator Box (2) is the slave, which picks the data from the cloud (30), as per the algorithm logic of Detachable Actuator Box (2) working.

Many Masters-Slave
- a. Each of the parameters sensor and sampling Boxes (Liquid Parameter Measuring Box, Atmosphere parameters Sensor Box, Height Measuring Sensor Box, Flow rate Measuring sensor Box, etc.). can be the Master on their own.
- b. This Liquid Parameters Sensor and Sampling Box (1) is connected through the Wi-Fi (44) to the other parameter sensor and sampling box
- c. All measurement from the various parameter sensor box (1) are stored in their respective Circuits, as mentioned in the working of the circuits of the respective boxes above, which in turn stores the data in the cloud.
- d. The logic of the Algorithm for comparing the measurement of the devices with the standards, is in the respective Circuits, as mentioned in the working of the algorithms circuits of the respective boxes above,
- e. The Detachable Actuator Box (2) is the slave, which picks the data from the cloud, as per the algorithm logic of Detachable Actuator Box (2) working.

The set of instruction (38) incudes logic (41), algorithm (42) and user input instruction (36). The user input instructions (36) may be command or code or text message etc.

Below are the algorithms (42) which are used in the SMART IoT device of present invention.

The Sample Algorithm Code

```
-> Main Box
START
// Declare the all the input output pins
//connecting to the WIFI with SSID and password
if (!wifi.connectAP(ssid, psswd))
    {
        //Serial.println(F("Error connecting to WiFi"));
        while (1) {
            ...
        }
    }
// Reset the device
// check connection between all the devices.
    mradio.begin( ); //begin the radio connection among all the devices
...
    mradio.openWritingPipe(path); // 00002 is the path for communication
// Calibration
if ( calib_swt == 1) // if calibration switch is ON
```

The Sample Algorithm Code

```
    {
        Serial.println(F("Calibraing the sensors"));
        ..
    }
//calculating the water level
    digitalWrite(WATER_LEVEL_TRIG, HIGH);
    Serial.print(F("Volume: "));
// collecting the sample
if ( calib_swt == 0) // if calibration switch is OFF
    {
        Serial.println(F("Collecting the Sample"));
        ..
    }
// Calculating EC and pH
phVoltage = (analogRead(PH_PIN) * 5000.0) / 1024.0;
// read the voltage in mV
ecVoltage = (analogRead(EC_PIN) / 1024.0) * 5000.0;
// read the voltage in mV
//Updating the data to the cloud
    ThingSpeak.setField(1, EC avg);
    ......
    ThingSpeak.setField(5, distance);
// Checking the whether the parameters are in range or not
if(EC_avg < 1600)
{
Message[0] = 4;
. ..
}
if (PH avg > 6.5) // add pH down acidic solution
    {
        Message[3] = 1;
        ...
    }
//sending the response to actuator based on the above calculations
mradio.write(&Message , sizeof(Message));
    Serial.println("TRansmitted to Actuator ");
END
->Actuator code
START
// Declare the all the input output pins
//connecting to the WIFI with SSID and password
if (!wifi.connectAP(ssid, psswd))
    {
        //Serial.println(F("Error connecting to WiFi"));
        while (1) {
            ...
        }
    }
// Reset the device
// check connection between all the devices.
    sradio.begin( ); //begin the radio connection among all the devices
...
    msradio.openWritingPipe(path); // 00002 is the path for communication
//Actuator receives the information from master
if (sradio.available( ))
    {
        sradio.read(&Message, sizeof(float));
        Serial.println("after reveived");
        ..
    }
//Acts according to the received data
    digitalWrite(EC, LOW); // adding nutrient to maintain EC
    delay(EC_1dose);
    digitalWrite(EC, HIGH);
    digitalWrite(PH_N, HIGH); // adding buffers to maintain pH
    digitalWrite(PH_A, HIGH); // adding buffers to maintain pH
END
```

In the above said device and/or system of FIGS. 1-16:
  When the Wi-Fi system (44.1) or (44.2) of (44) cannot be connected to cloud server (30), it can be replaced by localized solution by providing local Wi-Fi/Zigbee as communication module (44.3) to ensure data goes to local server.
  The Dousing Liquids (15) are the supplemental liquids for example water, buffer solutions, nutrient solutions and other solutions required to be added/supplemented to the sample source to stabilize and maintain parameters at desired level at source. In one embodiment, Dousing Liquids (15) comprises buffer solutions (acid solution and/or alkaline solution) to maintain pH parameter, nutrient solutions to maintain EC parameter, water and other solutions depending on the parameters to be stabilize and maintained at source.

The controller in the circuit board comprises one or more memory for storage of instructions, data, algorithms, and logics. The memory can be Electrically Erasable Programmable Read-Only Memory (EEPROM) or any other type of memory. In one embodiment, the memory of controller comprises EEPROM.

The Cloud Data Representation Samples

The basic data available in cloud can be accessed in various format in various type of user interface such computer interface display, mobile application interface display etc.

The Data of the SMART IoT System can be represented in the SMART app in any of the smart mobile phones in the form of: Graphs, Key parameters, Highlighted in indicative color to represent within range or out of range, Alerts.

Figure 13:
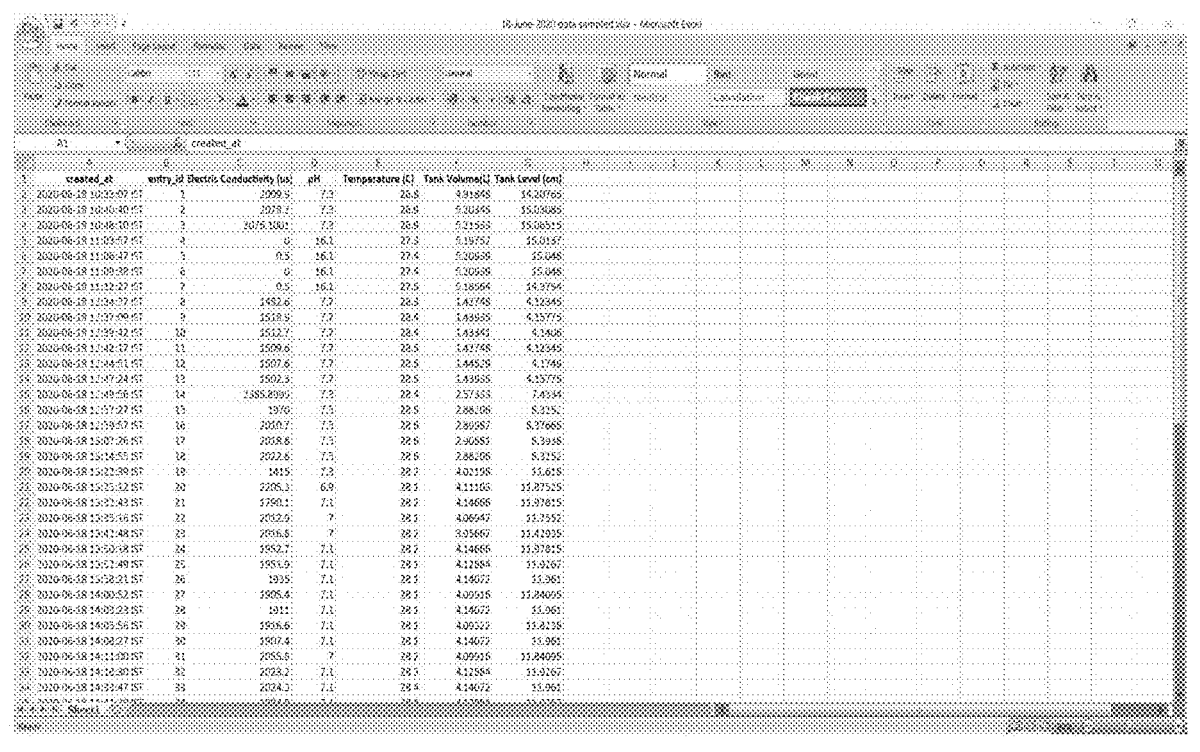

FIG. 13: Shows an example of Data Out-put format (Microsoft Excel Format).

Shows measured values of different parameters such as Electric Conductivity (EC), pH, Temperature, Tank Volume, Tank Level obtained by the device of the present invention in Microsoft Excel Format.

Figure 14:
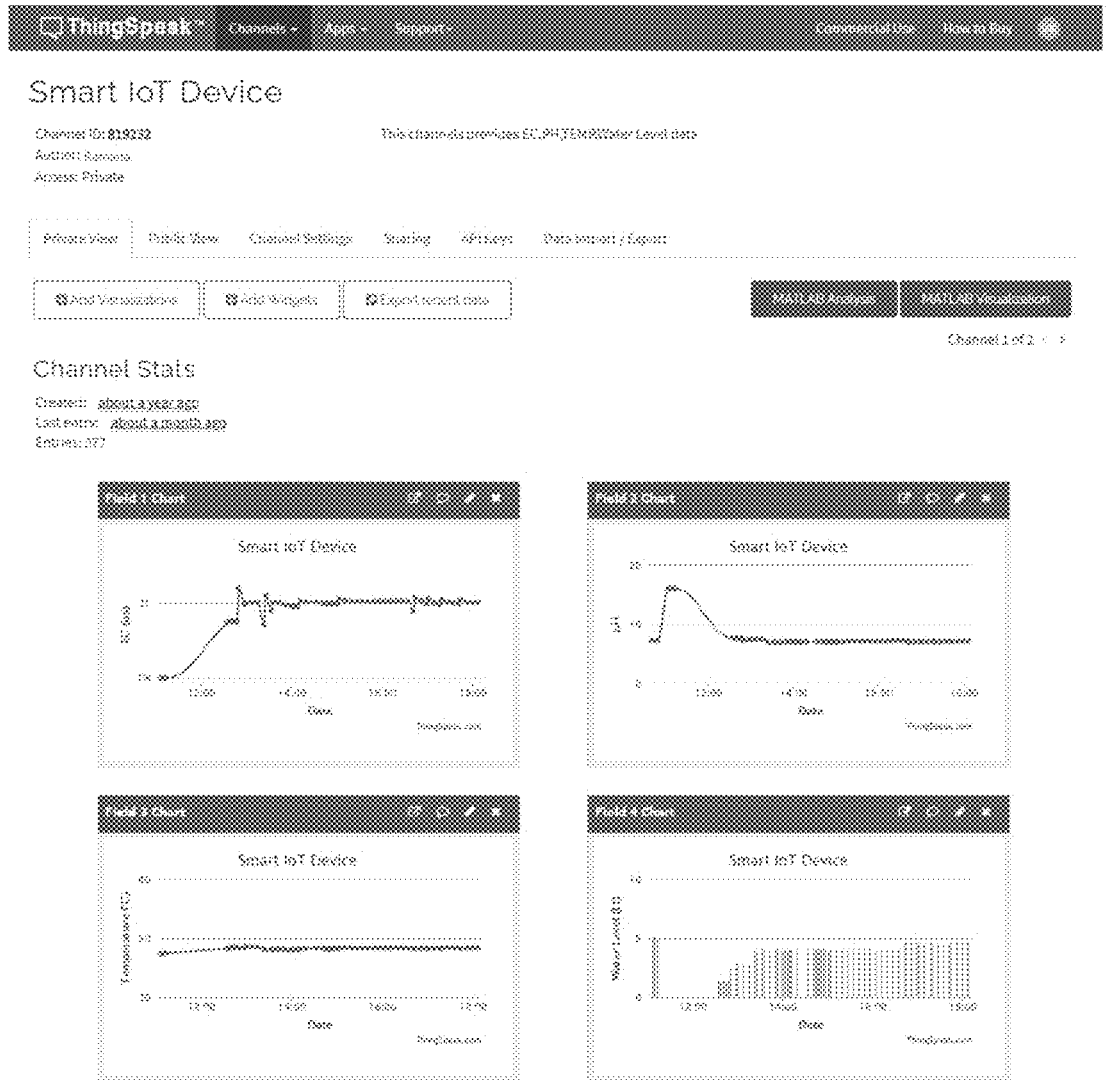
FIG. 14: Shows an example of Data Out-put format (Graph).

FIG. 14: Shows an example of Data Out-put format (Graph) for parameters Electric Conductivity (EC), pH, Temperature, and Water Level respectively in four graphs measured at four different fields.

A SMART IoT System in Action—Application in Agriculture Industry (FIG. 15).

Figure 16:
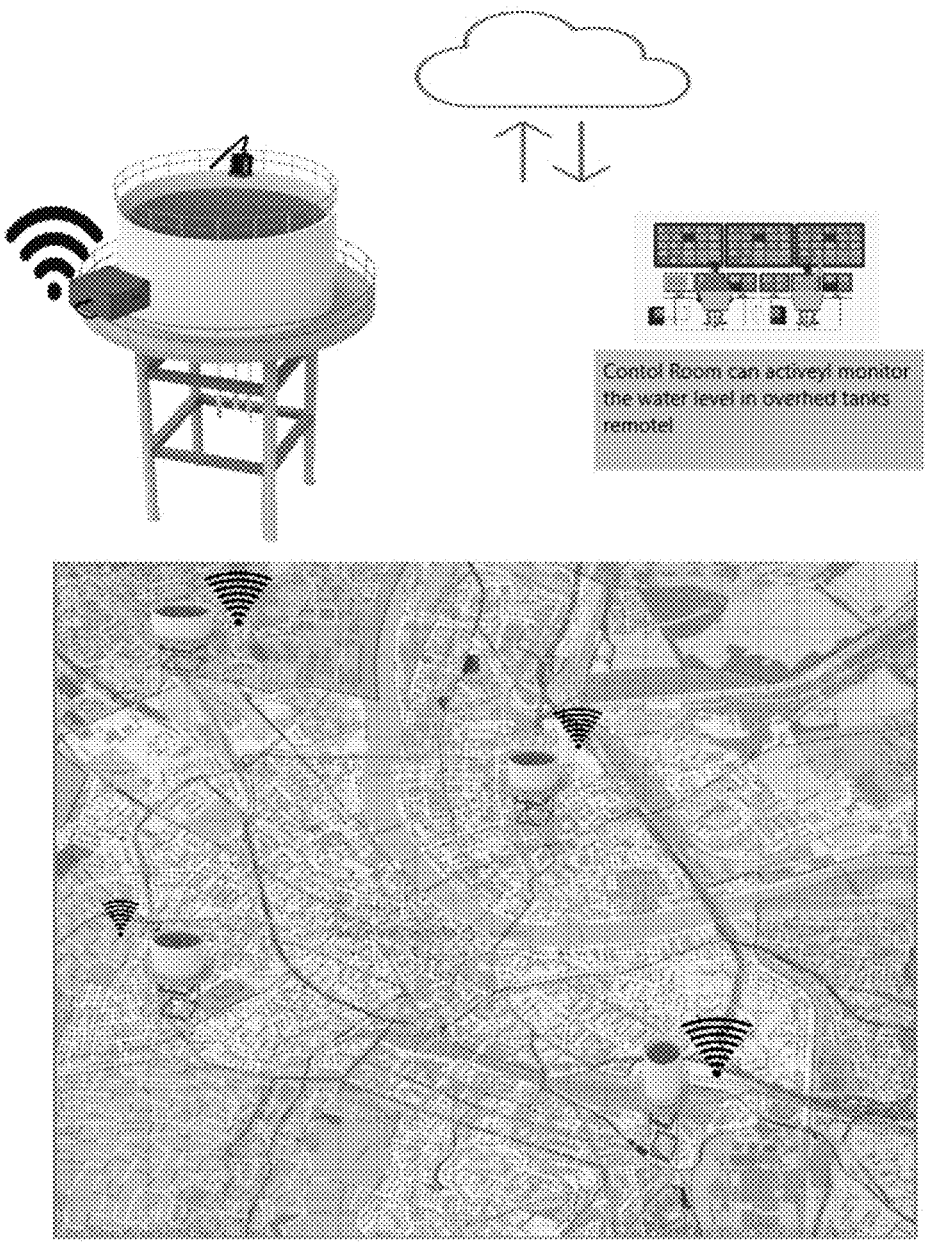
FIG. 16: Shows SMART IoT System in Action—Application in Overhead Tanks level Monitoring with Standalone Water Level Sensor (with Device of FIG. 12a).

A SMART IoT System in Action—Application in Overhead Tanks level Monitoring with Standalone Water Level Sensor (FIG. 16).

FIGS. 15 and 16 show the practical implementation of the SMART IoT device as described herein in the present invention.

FIG. 15: Shows SMART IoT System in Action—Application in Agriculture Industry (with Device of FIG. 1, FIG. 7*a*)

FIG. 15 shows in action application of SMART IoT Devices used in the agricultural industry. The SMART IoT device is connected near the water reservoir from which the water is transferred to the plants. The water sample from the reservoir is collected by the sample collecting motor or peristaltic pumps (10) and stored into the sample containers (6) of the IoT device. The collected samples are analyzed using the said logic (41) and algorithm (42) and the results are sent to the cloud over a Wi-Fi network (44). Based upon the results of the sensor and sampling result, the detachable actuator box (2) which is coupled with the sensor and sampling box (1) using the detachable couplers (40) reads the data from the cloud (30) and accordingly the algorithm (42) of the detachable actuator box (2), the respective relay of the douser motor (13) is activated and appropriate douser is poured into the water reservoir, thus maintaining the standard parameters of the reservoir. It can be seen that the process of the SMART IoT device is performed using the Wi-Fi network (44) and results are displayed on the connected laptop, PC, or mobile phone (35). The Data of the SMART IoT System can be represented in the SMART app in any of the smart mobile phones in the form of: Graphs, Key parameters, highlighted in indicative color to represent within range or out of range or Alerts.

FIG. 16: Shows SMART IoT System in Action—Application in Overhead Tanks level Monitoring with Standalone Water Level Sensor (with Device of FIG. 12*a*)

Another practical application of the said SMART IoT device is shown in FIG. 16 of the present application. The figure shows the device in Action for Application in Overhead Tanks level Monitoring with Standalone Water Level Sensor. The Standalone Water Level Sensor are mounted on overhead tanks for water level detection. Different such standalone water level sensors are fitted at different remote location in the area. All the modules are connected through the Wi-Fi network and can be controlled remotely siting in the control room.

This SMART IoT device of the present invention is a continuous system, and can be placed anywhere near the Application System.

In one embodiment, if the application system is of nature of heat environment or under water environment, then the device/system of the present invention can be used along with appropriate protective means to avoid direct contact of Heat or Water.

The invention of the SMART (Sample, Measure, Analyze, Report, Stabilize) Internet of Things (IoT) device is towards Industries and Processes for maintaining the key parameters like PH, EC, Temperature, Liquid Levels, Light Luminosity, Liquid Flow rate, Dissolved Oxygen, Carbon Dioxide, etc.

In another embodiment, the invention discloses and provides a SMART IoT system (100') for automatically performing the continuous monitoring and stabilizing functions to control key controllable parameters (P) of application system (51) at application field (52) at desired parameter level, comprising the SMART IoT device (100) herein above described.

The SMART IoT system (100') comprises:
 a Sensor and Sampling Box (1) to perform the monitoring functions of sampling, measuring, analyzing, reporting;
 an Actuator Box (2) to perform stabilizing function;
 a Control Panel (24) for user input and indication;
 a Network System (25) for communication;
 one or more Controllers (26) to control the all the functions of the device;
 one or more Circuit Boards (27) to connect all the device components electrically;
wherein,
 the said sensor and sampling box (1) collect samples (50) from the sample source (53), measure the parameters (P), analyze the measured parameter value (31), store and report the measured data as signal to cloud server (30) via network system (25) and drain back the samples (50) into the source (53) and continue this monitoring function in cycle;
wherein,
 the one or more controllers (26) with the help a set of instructions (38), compares the measured parameter value (31) with standard parameter value (32);
wherein,
 when a deviation (33) in the measured values (31) is observed by the controller (26), it sends the deviation data and signal to cloud server (30), notifies the user (19) at user interface (35); andwherein,
 based on set of instructions (38), the controller (26) triggers and activates the actuators (11) of the actuator box (2) to perform stabilizing function to correct and stabilize the respective parameters (P) where the sample parameter deviation (33) observed.

The SMART IoT system (100') monitors controllable parameters (P) selected from pH, EC, Temperature, Liquid Levels, Light Luminosity, Liquid Flow Rate, Dissolved Oxygen and Carbon Dioxide.

a. The operating step of each cycle of the liquid parameter sensor and sampling box (1) of the system comprises: starting of the sample collecting motor and drawing the sample into the holder;
b. starting the analyzation of the sample;
c. starting of sample module circuitry of the main module and the sensors for EC, PH, liquid temperature, etc. record the readings in each cycle of liquid stabilizing system;
d. storing of the reading as measured values (31) in open source cloud server (30);
e. displaying the stored reading;
f. comparing the measured values (31) results with the standard values (32) using logic and calculating the deviation of parameter;
g. concluding the recording of parameter and starting the system motor to drain the liquid back into the source.

The operating step of each cycle of the detachable actuator box (2) of the system comprises:

a. retrieving the stored data by the parameter sensor and sampling box from the cloud (30) using a Wi-Fi system (44) of the network system (25);
b. activating the corresponding douser based upon deviation (33) calculated by the parameter sensor and sampling network;
c. calculating the dosage quantity of douser;
d. sending the calculated dosage to the source;
e. checking for any other deviation (33) recorded by the parameter sensor and sampling box, optionally if any deviation (33) is recorded, repeating step (b)-step (d);

The timings of the sampling motors (10) of the system are timed which allows the sample liquid (50) to be held in the containers (6) for a time set time minutes which allow to stabilize the sample. The said cycle of the system is repeated at a preset time interval, which ensures continuous monitoring and measurement of parameters.

A SMART IoT system (100') involving the SMART IoT device (100) as described above and as shown in FIGS. 1-16. For the purpose of:
1. Increased Yields
2. Higher throughput
3. Maintaining Environment Norms
4. Efficient Systems & Mechanism of the Process
5. Maintaining Quality of Process and Equipment
6. Ease of Use Portable Lab
7. Continuous Monitoring System
8. And more Application
This product is applicable for various Industries, and Processes:
1. Agriculture
2. Sewage Treatment Plant
3. Pharma/Bio-Medical
4. Reverse Osmosis Plant
5. Distilleries
6. And More Few of the various measuring Devices/Sensors that can be compatible with the IoT SMART device/system of the present invention are devices that can measure:
1. PH Sensor
2. EC Sensor
3. Water Flow Sensor
4. Ultrasonic Level Sensor
5. Pressure Sensor
6. Water Temperature Sensor
7. Air Humidity Sensor
8. Air Temperature Sensor
9. Light intensity Sensor
10. Biomedical Sensor
11. Total Solid Measurement Sensor The above mentioned measuring devices/sensors are non-limiting to the device and/or system of the present invention. There are many other devices, and applications that are compatible or can be developed to be compatible with this SMART IoT device.

Advantages

The current known systems are limited to one application, (or) do few steps of sampling, measuring, analyzing, and reporting (or) Limited to capture information at Cloud.

The SMART IoT (Internet of thing) device of the present invention is:
1. One Stop Device for multiple applications.
2. Ensures all steps of Sampling, Measuring, Analyzing, Reporting and sTablizing is done at one place.

It is a continuous monitoring and automatic key parameters stabilization device, with cloud storage of information, and with a long term view of having a database for Artificial Intelligence.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A SMARS (Sample, Measure, Analyze, Report, Stabilize) Internet of Things (IoT) device for automatically performing the continuous monitoring and stabilizing functions to control key controllable parameters of application system at application field at desired parameter level, the device comprises components:

a Sensor and Sampling Box to perform the monitoring functions of sampling, measuring, analyzing, reporting;
an Actuator Box to perform stabilizing function;
a Control Panel for user input and indication;
a Network System for communication;
one or more Controllers to control the all the functions of the device;
one or more Circuit Boards to connect all the device components electrically;
wherein,
    the said sensor and sampling box collect samples from the sample source, measure the parameters, analyze the measured parameter value, store and report the measured data as signal to cloud server via network system and drain back the samples into the source and continue this monitoring function in cycle;
wherein,
    the one or more controllers with the help a set of instructions, compares the measured parameter value with standard parameter value;
wherein,
    when a deviation in the measured values is observed by the controller, it sends the deviation data and signal to cloud server, notifies the user at user interface; and
wherein,
    based on set of instructions, the controller triggers and activates the actuators of the actuator box to perform stabilizing function to correct and stabilize the respective parameters where the sample parameter deviation observed.

2. The SMARS (Sample, Measure, Analyze, Report, Stabilize) IoT device as claimed in claim 1, wherein the Sensor and Sampling Box and the Actuator Box are connected by detachable couplers, wherein when needed, the Actuator Box is physically detached from the SMARS (Sample, Measure, Analyze, Report, Stabilize) IoT device, while electronically connected with the SMARS (Sample, Measure, Analyze, Report, Stabilize) IoT device by the help of Network System and able to perform the same functions as perform in physically attached Actuator Box.

3. The SMARS (Sample, Measure, Analyze, Report, Stabilize) IoT device as claimed in claim 1, wherein the Sensor and Sampling Box comprises:
a chamber accommodating one or more sample containers which hold samples,
one or more sensors holding slots to hold one or more measuring sensors,
one or more sample collecting motors and
one or more inlet/outlet ports.

4. The SMARS (Sample, Measure, Analyze, Report, Stabilize) IoT device as claimed in claim 3, wherein
opening of sensors holding slots correspond to opening of container which enables insertion and placing of sensors inside the samples of respective containers for measuring controllable parameters of the respective samples; and
sampling pipe connections connect sampling motors, sample inlet/outlet of sample containers and sample sources for inlet and outlet of samples of one or more application system at application field where one or more parameters are desired to be monitored, analyzed, and stabilized.

5. The SMARS (Sample, Measure, Analyze, Report, Stabilize) IoT device as claimed in claim 1, wherein the Actuator Box comprises:
one or more actuators;
one or more dousing containers for holding dousing liquids;
one or more douser Motors;
actuators outlet pipes, each pipe at one end connected with dousing container to draw dousing liquid and at other end connected with the sample source of one or more application system at application field where one or more parameters are desired to be stabilized.

6. The SMARS (Sample, Measure, Analyze, Report, Stabilize) IoT device as claimed in claim 1, wherein the controller performs the said stabilizing function by the help of dousing liquids stored in dousing containers of the actuator box, wherein the actuators drives the dousing motors to draw dousing liquids in required doses and sends into the sample source where the deviation observed, wherein the source liquid with imbalanced parameter level receives the dousing liquid and stabilize the parameter.

7. The SMARS (Sample, Measure, Analyze, Report, Stabilize) IoT device as claimed in claim 1, wherein the control panel module comprises reset button, calibration button, save button, LED indicator and ON/OFF switch.

8. The SMARS (Sample, Measure, Analyze, Report, Stabilize) IoT device as claimed in claim 1, wherein the one or more controllers are configured with a set of instructions stored in a memory or provided to controller to control and to operate the device to perform all the functions of the IoT device autonomously for continuous monitoring and stabilization of desired parameters.

9. The SMARS (Sample, Measure, Analyze, Report, Stabilize) IoT device as claimed in claim 8, wherein said set of instructions comprises user input instructions and predefined instructions fed and stored in the device controller.

10. The SMARS (Sample, Measure, Analyze, Report, Stabilize) IoT device as claimed in claim 1, wherein said one or more circuit boards electrically connect measuring sensors, sampling motors, actuators, douser Motors, control panel module, network system, controller devices, USB port, power supply module, Battery System, Voltage Regulators and Motor Driver.

11. The SMARS (Sample, Measure, Analyze, Report, Stabilize) IoT device as claimed in claim 1, wherein the network system for communication comprises one or more Wi-Fi system, cloud server and network protocols combinedly enables send and receive of communication data or signals between the IoT device, server, user and one or more external devices and peripheral devices, connected directly or indirectly with the IoT device or its network system, wherein where the Wi-Fi system cannot be connected to cloud server, it can be replaced by localized solution by providing local Wi-Fi/Zigbee as communication module to ensure data goes to local server.

12. The SMARS (Sample, Measure, Analyze, Report, Stabilize) IoT device as claimed in claim 1, wherein the device optionally comprises Peripheral Sensor Boxes, which can be attached with the device for monitoring of parameters.

13. The SMARS (Sample, Measure, Analyze, Report, Stabilize) IoT device as claimed in claim 12, wherein the peripheral sensor box comprises Atmosphere Parameter Sensor Box for monitoring of parameters Temperature, Luminosity, Oxygen level, and Co2.

14. The SMARS (Sample, Measure, Analyze, Report, Stabilize) IoT device as claimed in claim 1, wherein the device optionally comprises remotely located additional Independent Sensor Box and connected to the system of the device to perform the measuring function.

15. The SMARS (Sample, Measure, Analyze, Report, Stabilize) IoT device as claimed in claim 14, wherein the said remotely located individual measuring device sensor box comprises Height Measuring Device, Flow Rate Measuring Device, Soil Parameter Measuring Device.

16. The SMARS (Sample, Measure, Analyze, Report, Stabilize) IoT device as claimed in claim 1, wherein the device retrieves data and inputs stored in the cloud by peripheral sensor box, additional standalone sensor box and one or more other stand-alone external devices, wherein the said data and input of external devices are stored in the cloud in the format of the SMARS (Sample, Measure, Analyze, Report, Stabilize) IoT device data.

17. The SMARS (Sample, Measure, Analyze, Report, Stabilize) IoT device as claimed in claim 1, wherein the said triggering by controller is based on user input instructions provided by user or predefined set of instructions stored in the memory of the controller.

18. The SMARS (Sample, Measure, Analyze, Report, Stabilize) IoT device as claimed in claim 1, wherein the device comprises only one main circuit board PCB with one controller.

19. The SMARS (Sample, Measure, Analyze, Report, Stabilize) IoT device as claimed in claim 1, wherein the device comprises one controller in the main circuit board of the sampling and sensor box and one controller in the main circuit board of the actuator box.

20. The SMARS (Sample, Measure, Analyze, Report, Stabilize) IoT device as claimed in claim 1, wherein the Sensor and Sampling Box comprises:
   a chamber accommodating sample containers which hold samples,
   sensors holding slots to hold respective number of measuring sensors.

21. The SMARS (Sample, Measure, Analyze, Report, Stabilize) IoT device as claimed in claim 1, wherein the Sensor and Sampling Box comprises:
   a chamber accommodating two sample containers which hold samples,
   two sensors holding slots to hold measuring sensors,
   Sample Collecting Motors and inlet/outlet ports.

22. The SMARS (Sample, Measure, Analyze, Report, Stabilize) IoT device as claimed in claim 1, wherein the Actuator Box comprises:
   actuators;
   douser Motors;
   actuators outlet pipes.

23. The SMARS (Sample, Measure, Analyze, Report, Stabilize) IoT device as claimed in claim 1, wherein the sampling motors and the dousing motors are peristaltic pump.

24. The SMARS (Sample, Measure, Analyze, Report, Stabilize) IoT device as claimed in claim 1, wherein said key controllable parameters are selected from pH, EC, Temperature, Liquid Levels, Light Luminosity, Liquid Flow Rate, Dissolved Oxygen and Carbon Dioxide.

25. The SMARS (Sample, Measure, Analyze, Report, Stabilize) IoT device as claimed in claim 1, wherein the operating step of each cycle of the liquid parameter sensor and sampling box comprises:
   a. starting of the sample collecting motor and drawing the sample into the holder;
   b. starting the analyzation of the sample;
   c. starting of sample module circuitry of the main module and the sensors for EC, PH, liquid temperature, etc. record the readings in each cycle of liquid stabilizing system;
   d. storing of the reading as measured values in open source cloud server;
   e. displaying the stored reading;
   f. comparing the measured values results with the standard values using logic and calculating the deviation of parameter;
   g. concluding the recording of parameter and starting the system motor to drain the liquid back into the source.

26. The SMARS (Sample, Measure, Analyze, Report, Stabilize) IoT device as claimed in claim 1, wherein the operating step of each cycle of the detachable actuator box comprises:
   a. retrieving the stored data by the parameter sensor and sampling box from the cloud] using a Wi-Fi system of the network system;
   b. activating the corresponding douser based upon deviation calculated by the parameter sensor and sampling network;
   c. calculating the dosage quantity of douser;
   d. sending the calculated dosage to the source;
   e. checking for any other deviation recorded by the parameter sensor and sampling box, optionally if any deviation is recorded, repeating step (b)-step (d).

27. The SMARS (Sample, Measure, Analyze, Report, Stabilize) IoT device as claimed in claim 1, wherein the timings of the sampling motors are timed which allows the sample liquid to be held in the containers for a time set time minutes which allow to stabilize the sample.

28. The SMARS (Sample, Measure, Analyze, Report, Stabilize) IoT device as claimed in claim 1, wherein said cycle is repeated at a preset time interval, which ensures continuous monitoring and measurement of parameters.

29. A SMARS (Sample, Measure, Analyze, Report, Stabilize) IoT system for automatically performing the continuous monitoring and stabilizing functions to control key controllable parameters of application system at application field at desired parameter level, comprising the SMARS (Sample, Measure, Analyze, Report, Stabilize) IoT device as claimed in claim 1.

* * * * *